United States Patent
Heggelund et al.

(10) Patent No.: US 9,214,006 B2
(45) Date of Patent: *Dec. 15, 2015

(54) HIDDEN SURFACE REMOVAL IN GRAPHICS PROCESSING SYSTEMS

(71) Applicant: ARM Limited, Cambridge (GB)

(72) Inventors: Frode Heggelund, Trondheim (NO); Kenneth Ostby, Trondheim (NO)

(73) Assignee: ARM LIMITED, Cambridge (GB)

( * ) Notice: Subject to any disclaimer, the term of this patent is extended or adjusted under 35 U.S.C. 154(b) by 203 days.

This patent is subject to a terminal disclaimer.

(21) Appl. No.: 13/909,561

(22) Filed: Jun. 4, 2013

(65) Prior Publication Data
US 2014/0354654 A1    Dec. 4, 2014

(51) Int. Cl.
*G06T 11/40* (2006.01)
*G06T 15/00* (2011.01)
*G06T 1/20* (2006.01)
*G06T 15/40* (2011.01)

(52) U.S. Cl.
CPC . *G06T 1/20* (2013.01); *G06T 11/40* (2013.01); *G06T 15/005* (2013.01); *G06T 15/40* (2013.01)

(58) Field of Classification Search
None
See application file for complete search history.

(56) References Cited

U.S. PATENT DOCUMENTS

| 6,646,639 | B1 | 11/2003 | Greene et al. |
| 8,130,222 | B1 * | 3/2012 | Urry ............... 345/422 |
| 8,854,364 | B1 | 10/2014 | Voorhies |
| 2004/0119710 | A1 | 6/2004 | Piazza et al. |
| 2006/0139366 | A1 | 6/2006 | Piazza et al. |
| 2008/0117221 | A1 | 5/2008 | Hutchins et al. |
| 2013/0076762 | A1 | 3/2013 | Heggelund et al. |

OTHER PUBLICATIONS

Out-of-order execution, Wikipedia, Dec. 9, 2013, 4 pgs., Available at http://en.wikipedia.org/wiki/Out-of-order_execution.
Speculative execution, Wikipedia, Dec. 9, 2013, 3 pgs., Available at http://en.wikipedia.org/wiki/Speculative_execution.
Slipstream (computer science), Wikipedia, Dec. 9, 2013, 1 pg., Available at http://en.wikipedia.org/wiki/Slipstream_(computer_science).
Office Action dated Jan. 22, 2015 in U.S. Appl. No. 13/716,952, 49 pages.
Nystad, et al., U.S. Appl. No. 13/716,952, filed Dec. 17, 2012, titled "Hidden Surface Removal in Graphics Processing Systems,".
Aila, et al., "Delay Streams for Graphics Hardware," 2003.

(Continued)

*Primary Examiner* — Carlos Perromat
(74) *Attorney, Agent, or Firm* — Vierra Magen Marcus LLP

(57) ABSTRACT

Early depth test stages of a graphics processing pipeline broadcast information about fragments having conditional discard tests associated with them and that pass those early depth tests to other stages in the pipeline. The other stages in the pipeline use the early depth test pass information to determine if the processing of any fragments that they are currently processing can be slowed down. If a fragment that triggered the slowing down of the processing of fragments that are already in the pipeline passes all the conditional discard tests it is to be subjected to, a signal that triggers stopping of the processing of the fragments whose processing it had previously slowed down is sent. If the fragment fails a conditional discard test it is to be subjected to, a signal triggering the reviving of the processing of the fragments whose processing it had previously slowed down is sent.

22 Claims, 1 Drawing Sheet

(56) References Cited

OTHER PUBLICATIONS

Combined Search and Examination Report in GB Patent Application No. GB1322278.1 dated Jun. 19, 2014, 5 pages.

Response to Office Action dated May 20, 2015 in U.S. Appl. No. 13/716,952, 12 pages.

Notice of Allowance dated Jun. 8, 2015 in U.S. Appl. No. 13/716,952, 13 pages.

* cited by examiner

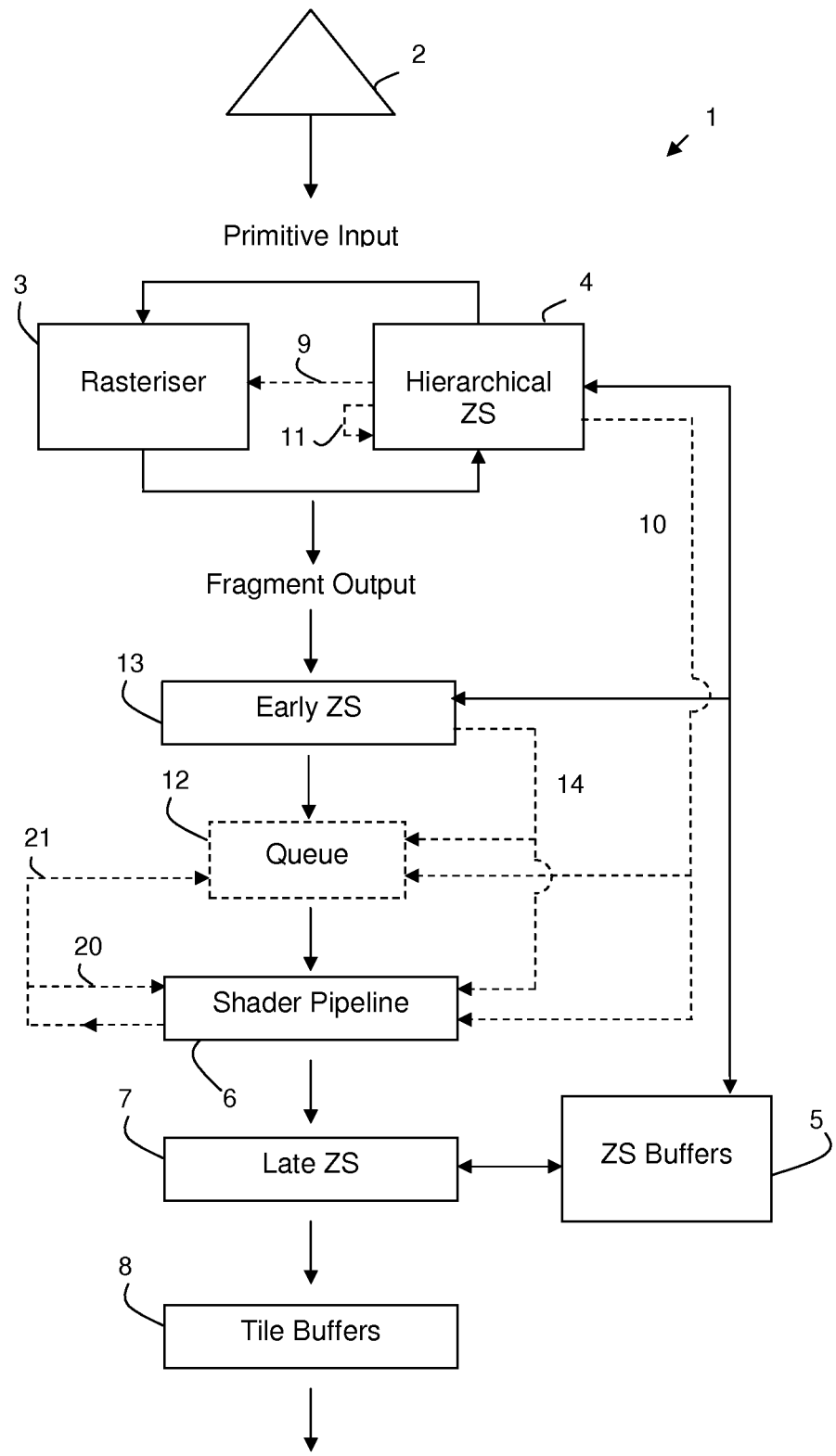

HIDDEN SURFACE REMOVAL IN GRAPHICS PROCESSING SYSTEMS

BACKGROUND

The technology described herein relates to the processing of computer graphics, and in particular to hidden surface removal in graphics processing.

As is known in the art, graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

In one known technique for graphics processing, which is commonly referred to as "immediate mode" graphics processing or rendering, primitives are processed (rasterised and rendered) as they are generated, one after another.

In this type of system, the primitives (their vertices) are passed to the graphics system on a first-come, first-served basis, and primitives are thus rendered in the order that they are received.

It is also known in graphics processing systems to use so-called "tile-based" or "deferred" rendering. In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

In both immediate mode and tile-based rendering, the input to the rasterisation and rendering processes will typically include a list of graphics commands to be executed by the graphics processor. This "command list" will include, as is known in the art, commands instructing the graphics processor to draw primitives, and commands instructing other graphics processes, such as rendering state changes, start and end tile commands (in a tile-based system), etc.

In immediate mode rendering this command list will simply list the commands to be executed one-after-another, whereas in tile-based rendering the list may be, and typically will be, divided into "tiles" (i.e. will list the commands for each tile separately to the commands for the other tiles).

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater).

The problem of "overdraw" could be significantly reduced by sending primitives for rendering in front-to-back order. However, other graphics processing requirements, such as the need for coherent access to resources such as textures, and the need to minimise the number of API calls per frame, generally mandate other ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of other techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, it is known to carry out forms of hidden surface removal before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, as is known in the art.

These arrangements try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal techniques only take account of fragments that have completed their processing (that have already been rendered) at the time the new, e.g., primitive or fragment (the primitive or fragment being "early" tested) is being tested. This is because the relevant test data (such as the Z-buffer) only contains data from fragments that have already been processed.

In a proposal described in "Delay Streams for Graphics Hardware", by Timo Alia, Ville Miettinen and Petri Nordlund, Siggraph 2003, a graphics processing pipeline that uses an early-Z test is modified to include a delay stream and a second early occlusion test stage. The second early occlusion test takes place before rasterising and rendering, but after a first early occlusion test stage and the delay stream.

The idea here is that by the time a given primitive reaches the second early occlusion test stage, more primitives will have contributed to the, e.g., Z-buffer data (since the deliberate delay stream allows time for more primitives to complete their processing before a primitive reaches the second early occlusion test stage), such that that second occlusion test stage can take account of more primitives than in standard, single early occlusion testing arrangements.

However, this arrangement requires some modifications to the graphics processing pipeline, such as the addition of a second early-occlusion test stage, and only operates on primitives (and so is non-exact and must be very conservative (and so can give little or no benefit in complex meshes, for example)).

It has also been proposed to use a per-sample or per-fragment sorting pass before sending any fragments to the rendering pipeline so as to identify the front-most fragment for each fragment position before the fragments are issued to the rendering pipeline. This can effectively remove all hidden surfaces, regardless of the order the primitives are received in (as it identifies the fragment that needs to be processed for each fragment position before the fragments are sent for rendering).

However, this arrangement has a fixed cost irrespective of the order that the primitives are received in (i.e. irrespective of the rendering order specified by the application), and has to apply a large number of special cases to handle things like transparency, etc., where the application specified rendering order must be preserved. The cost for this sorting also increases with the number of samples being considered (as it essentially has to sort per sample), thereby making rendering using a high number of samples, such as multi-sampled anti-aliasing, very expensive when using this technique.

It is also known for application (e.g. game) developers to configure the application such that each render output, e.g., frame, is, in effect, rendered twice, first of all to draw all the opaque geometry with all rendering states other than the Z-test and Z-write disabled, and then a second time with full render states enabled.

This has the effect that the first rendering pass effectively fills the Z-buffer with the Z (depth) value of the closest opaque primitive for each fragment (sample) position. In the second, full rendering pass, as the Z-buffer is now filled with the Z-value of the closest opaque primitive, any early-Z test on the second pass can more effectively reject occluded fragments, and in particular will take account of all the primitives rendered in the first, "Z-only" rendering pass, not just of primitives that have been rendered ahead of the fragment in question.

This technique therefore can provide a more efficient early-Z test process, but it has the disadvantage that a given render output must be generated by the application and processed by the graphics processing system twice, once for the Z-only pass, and then again for the "full" rendering pass. While this may not be too problematic for higher powered, e.g. desktop, graphics systems, other, lower powered graphics systems, such as for portable and mobile devices, may, e.g., have bandwidth constraints that make generating and rendering each entire potentially-visible render output twice undesirable.

The Applicants believe therefore that there remains scope for improved techniques for hidden surface removal in graphics processing systems.

BRIEF DESCRIPTION OF THE DRAWING

A number of embodiments of the technology described herein will now be described by way of example only and with reference to the accompanying drawing, in which:

FIG. 1 shows schematically an embodiment of a graphics processing system that is in accordance with the technology described herein.

DETAILED DESCRIPTION

A first embodiment of the technology described herein comprises a method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:

performing an early culling test in respect of at least one sampling point associated with a fragment generated by the rasteriser before the fragment is sent to the renderer for processing; and if the at least one sampling point passes the early culling test, sending the fragment onwards for processing and in response to the at least one sampling point passing the early culling test, determining if the processing of another sampling point that is in the graphics processing pipeline should be slowed down.

A second embodiment of the technology described herein comprises a graphics processing pipeline comprising:

a plurality of processing stages including a rasteriser that rasterises input primitives to generate graphics fragments to be processed, each graphics fragment having one or more sampling points associated with it, a renderer that processes fragments generated by the rasteriser to generate output fragment data, and an early culling test stage that performs an early culling test in respect of sampling points associated with fragments generated by the rasteriser before the fragments are sent to the renderer for processing; wherein the graphics processing pipeline is configured to:

in response to at least one sampling point associated with a fragment generated by the rasteriser passing the early culling test, send the fragment onwards for processing and determine if the processing of another sampling point that is in the graphics processing pipeline should be slowed down.

The graphics processing pipeline of the technology described herein includes an early culling test, such as an early depth test, before the renderer stage of the graphics processing pipeline, so as to try to cull graphics entities, such as sampling points, fragments and/or primitives, before they are processed by the renderer, as is known in the art.

However, the technology described herein, in response to a sampling point passing the early culling test, also determines if the processing of another sampling point that is being processed in the graphics processing pipeline should be slowed down (e.g. whether the priority for processing by the graphics processing pipeline of another sampling point that is being processed in the graphics processing pipeline can be reduced). In other words, the technology described herein extends the effect of the early cull testing at or after the rasterisation stage to allow it to also, potentially, affect the speed of processing of sampling points of primitives that have already been rasterised and sent to the rest of the pipeline for processing.

As will be discussed further below, this can then allow the results of the early culling test to be used to avoid and/or stop processing (to "kill") sampling points for primitives that are already in the pipeline, rather than simply to stop sampling points for new primitives (e.g. that will be occluded) from being rendered. This has the advantage, e.g., that the processing of sampling points in the pipeline for primitives that have previously passed the early cull test can still be stopped if a fragment for a later primitive that will occlude them is generated before their processing has been completed.

Thus the technology described herein can, for example, and unlike the prior art techniques, also reduce or avoid "overdraw" in the situation where a primitive and/or fragment is in fact occluded by a later primitive in the rendering order.

The effect of this is that the technology described herein can further reduce the extent to which hidden surfaces are unnecessarily processed in the graphics processing pipeline, as compared, e.g., to existing early-depth testing techniques. Moreover, this is without the need to perform costly per-sample or per-fragment sorting of samples/fragments before rendering takes place.

Indeed, an important advantage of the technology described herein is that it will not in fact intervene when the provided primitive order is optimal (i.e. front-to-back), thereby giving a minimal cost increase over "standard" early-depth testing arrangements in that event, but will take effect when the primitive order is "non-optimal" to then eliminate back-to-front primitives from processing. The cost of using the technology described herein is also independent of the level of multi-sampled anti-aliasing used, thereby making its use with higher order multi-sampled anti-aliasing relatively cheap (and the use of higher order multi-sampled anti-aliasing cheaper).

Moreover, because the technology described herein reduces the speed of processing by the pipeline of the sampling point(s) that are already in the pipeline, the technology described herein can still be used in situations where it may be uncertain at the time the early culling test is performed, whether the new primitive (fragment) will in fact occlude the sampling point(s) that are already in the pipeline (unlike, for example, a process that immediately discarded the sampling point(s) that are already in the pipeline—in that case the sampling points already in the pipeline could only be discarded if it was certain at the time the early culling test was performed that the new fragment would occlude them). This then means that the technology described herein can be used to (potentially) affect and stop the processing of more sampling points and fragments than would be possible, e.g., with a test that simply discarded sampling points or fragments already in the pipeline straightaway.

For example, the technology described herein can be used when the new fragment being early cull tested has as part of its state, one or more conditions that could result in the fragment being discarded during its processing (such as shader conditional discards), such that it cannot be known at the early cull (e.g. depth) testing stage whether the fragment will actually appear in the render output or not (such that it cannot be concluded at the early cull testing whether the new fragment will definitely occlude other fragments that are already in the processing pipeline.

Indeed, the Applicants have found that fragments can relatively commonly have conditional discard conditions associated with them for much graphics content and processing. As will be discussed further below, the technology described herein can be used to stop the processing of (to "kill") fragments and/or sampling points in the pipeline, even where the early culling tests cannot be immediately used to do that because a new fragment has a conditional discard test associated with it.

The rasteriser of the graphics processing pipeline can be configured to operate in any suitable and desired manner, for example as in known rasterising arrangements. It should, as is known in the art, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, the (and each) primitive being rasterised.

Each fragment generated by the rasteriser may represent (have associated with it) a single sampling point, or plural sampling points, as desired. In an embodiment, each fragment represents a set of plural, in an embodiment four (2×2), sampling points.

The rasteriser may be configured to generate the fragments one at a time, but in an embodiment is able to generate plural fragments at a time (simultaneously) (e.g. where a primitive covers plural spatially adjacent sampling points or sets of sampling points). In this case, if the rasteriser simultaneously generates a set of plural fragments, the fragments within the set are in an embodiment still processed individually by the fragment processing parts of the pipeline, such as the fragment shader. Having the rasteriser produce plural fragments simultaneously helps to create back pressure to thereby keep the rendering pipeline "filled up" with fragments.

In an embodiment, the rasteriser is a hierarchical rasteriser that operates to iteratively test primitives against progressively smaller patches of sampling points down to a given, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested in an embodiment corresponds to an integer number of fragments, such as 16×16, 8×8, 4×4 and/or 2×2 fragments.

The rasteriser in an embodiment starts with a large patch of the render target area and tests if the primitive in question is inside that patch. If not, the entire patch is discarded, and the next patch tested, and so on. On the other hand, if a primitive is found to be within the patch (to cover, at least in part, the patch), the patch is sub-divided, in an embodiment into 4 parts, and each "sub-patch" then tested in the same way, and so on, until a minimum patch size is reached (which in an embodiment corresponds to a 2×2 group of fragments) (but which could, e.g., be an individual sampling point, an individual fragment, or a different sized group of fragments).

Where in this arrangement the smallest patch size contains plural sampling points, the rasteriser in an embodiment then tests the individual sampling points in the final patch to see if they are covered by the primitive, and then generates fragments accordingly.

Where the fragments that are generated by the rasteriser can be associated with (and correspond to and represent) sets of plural sampling points, then each such graphics fragment in an embodiment has associated with it data indicating which of the sampling points in the set of sampling points that the fragment corresponds to are covered (e.g., and in an embodiment, by the primitive being sampled), i.e. in effect, which of the sampling points in the set of sampling points that the fragment corresponds to, the fragment is being used to render.

The information indicating which covered sample points the fragment is being used to render is in an embodiment associated with or part of the fragment data for the fragment that passes through the renderer (such as the RGB and alpha values for the fragment). In an embodiment, it is in the form of a coverage mask that indicates, for each sample position of the set of sample points that is associated with the fragment, whether that sample position is covered, i.e., in effect, whether the fragment is being used to render that sample point (i.e. whether its data should be stored for that sample point). In an embodiment this coverage mask is in the form of a bitmap that represents the sampling positions. The rasteriser in an embodiment generates the coverage masks.

The early culling test that the operation of the technology described herein uses may comprise any suitable such testing, such as early occlusion testing, such as depth (Z) testing and/or early stencil testing. In an embodiment it comprises an early depth (Z) test (or tests). In an embodiment it comprises both early depth and early stencil tests.

Any or all of the available early cull tests (early cull testing stages) of the graphics processing pipeline can be configured to operate in (to trigger operation in) the manner of the technology described herein. Where the graphics processing pipeline includes more than one early culling test (early cull testing stage), then in an embodiment all the early cull testing stages can trigger operation in the manner of the technology described herein. Thus, in an embodiment there is more than one early culling test in the pipeline.

The early culling test stage could operate on patches (sets) of plural fragments. For example, where the rasteriser can rasterise primitives into patches of plural fragments, such patches could then be subject as a whole to an early culling test. Thus, in an embodiment, the early culling test operates on patches (sets) of plural fragments. In this case, the early culling test will accordingly relate to a set of plural fragments (i.e. the patch of fragments being considered), and the performing of an early culling test in respect of at least one sampling point associated with a fragment will comprise performing an early culling test in respect of at least one set (patch) of plural fragments generated by the rasteriser (this does perform the culling test in respect of at least one sampling point associated with a fragment, since it effectively performs the early culling test for all the sampling points associated with the fragments in the set of plural fragments).

Thus, in an embodiment the pipeline includes an early depth (or early depth and stencil) tester that tests patches (sets) of plural fragments in common. This test is in an embodiment carried out only for patches (sets) of plural fragments that are fully (completely) covered by the primitive in question, and in an embodiment uses a range of depth values for the patch (set) of plural fragments.

In an embodiment any patch (set) of plural fragments that passes the early "patch" culling, e.g. depth and/or stencil, test can trigger operation in the manner of the technology described herein.

The early culling test can in an embodiment also or instead, and in an embodiment also, operate on single fragments. Thus, the pipeline in an embodiment includes an early culling tester, in an embodiment an early depth (or early depth and stencil) tester, that tests individual fragments. This test is in an embodiment carried out only for fragments that are fully (completely) covered by the primitive in question, and in an embodiment uses a depth value range or a single depth value for the fragment as a whole.

In this case, the early culling test will accordingly test single fragments (i.e. the fragments being considered), and the performing of an early culling test in respect of at least one sampling point associated with a fragment will comprise performing an early culling test in respect of at least one fragment generated by the rasteriser (again this does perform the culling test in respect of at least one sampling point associated with a fragment, since it effectively performs the early culling test for all the sampling points associated with the fragment in question).

In an embodiment any fragment that passes this (single fragment) early culling, e.g. depth and/or stencil, test can trigger operation in the manner of the technology described herein.

In an embodiment, the early culling test (there is an early culling test that) also or instead, and in an embodiment also, operates on (tests), single sampling points and/or sets of sampling points that contain fewer sampling points than the sets of sampling points that a given fragment is associated with (such as for two of the four sampling points that a fragment is associated with). In this case, the early culling test in an embodiment operates on single (covered) sampling points. In this case each sampling point will have an associated depth value, i.e., there will be a depth value for each sampling point (which it may share with other sampling points), that is used for the culling test.

Again, in an embodiment any sampling point that passes this sampling point early culling e.g., depth and/or stencil, test can trigger operation in the manner of the technology described herein.

Thus, in an embodiment, an early culling test is performed in respect of one or more of: a single sampling point associated with a fragment generated by the rasteriser; a single fragment generated by the rasteriser (and thus for all of (the set of) sampling points associated with the fragment); and a set of plural fragments generated by the rasteriser (and thus for all (the sets of) sampling points associated with the plural fragments).

In an embodiment, the early culling test or tests is operable in respect of (tests) both single sampling points, and fragments (and in an embodiment sets of plural fragments). This may be at different culling test points in the pipeline. This can then allow the technology described herein to generate hidden surface removal events from, e.g., full tile covering primitives down to single fragment and/or sampling point granularity.

In an embodiment, the pipeline includes an early culling test that tests sets of plural fragments and/or individual fragments (and in respect of which operation in the manner of the technology described herein can be triggered), followed by an early culling test that tests individual sampling points (and again in an embodiment in respect of which operation in the manner of the technology described herein can be triggered).

In an embodiment, the system includes an early culling test that compares a depth value range associated with a sampling point, fragment and/or set (patch) of plural fragments with a stored depth value range associated with the position of the sampling point, fragment, or set (patch) of plural fragments in question, to determine if the sampling point, fragment or set (patch) of plural fragments being tested passes the early culling test or not.

Associating ranges of depth values with fragment positions and/or sampling point positions facilitates depth testing incoming primitives against larger arrays (areas) of sampling positions (and/or fragment positions) (patches) in one go, and accordingly can allow the early culling test to determine in a single cycle whether a primitive will overlie (will overdraw) a larger patch of sampling positions. This can then be used to (potentially) stop the processing of (to "kill") larger groups of fragments and/or sampling points in the pipeline in one processing cycle.

A depth value range is in an embodiment stored for each patch of fragments that may be considered (cull tested).

The early culling test or tests themselves can be carried out in any suitable and desired manner, e.g., in the normal manner known in the art and/or used in the graphics processing system in question. They are in an embodiment carried out in an appropriately conservative manner, as is known in the art. They may, e.g., test the (or each) sampling point specifically, or may be tests that have the effect of testing the sampling point(s), even if they do not test the (or each) sampling point specifically.

In an embodiment, the early culling test in response to which it is determined whether the processing of another sampling point can be slowed down is a conservative early depth test that, in an embodiment, essentially operates to predict (determine) at the early cull testing stage if the new sampling point and/or fragment will pass a late (end of pipeline) depth test that is present in the pipeline. Thus, in an embodiment, the early culling test is a conservative early depth test.

The early culling test or tests should be and are in an embodiment only carried out in respect of fragments, and/or sampling points, having positions for which a suitable, e.g., depth, value is stored in the, e.g., depth buffer that the early culling test or tests uses. (As if the e.g., depth buffer does not contain a suitable depth value for the fragment position in question, the early depth test, for example, will not be able to determine whether the fragment being tested does lie in front of fragments that are already in the pipeline.)

In an embodiment, the system (and in an embodiment the rasteriser), in advance of rendering a set of primitives (e.g., for a tile or a draw call), generates and/or stores expected depth values, and in an embodiment ranges of expected depth values, for respective sampling positions, sets of sampling positions, fragments, fragment positions, patches of fragments, and/or sets of fragment positions, which ranges of depth values the culling test or tests can and in an embodiment do then use when testing primitives and fragments, etc., generated by the rasteriser. These ranges of expected depth values should represent (encompass) all the possible outcomes of the depth value for the patch, etc., in question, and are in an embodiment updated as the rasterisation and rendering proceeds using depth values and depth value ranges for individual sampling positions, fragments, patches of fragments, etc., that are generated and stored as sampling points and fragments undergo early and late depth testing as they are processed by the graphics processing pipeline.

Storing ranges of expected depth values means that the early culling test or tests (the depth test) can be performed for the fragments and/or sampling points generated by the rasteriser using the stored ranges of depth values, even if there are some fragments and/or sampling points having the same position that have not themselves actually updated the depth buffer yet (since the expected range of depth values can still be used to give an indication of whether the later fragment and/or sampling point will pass the depth test or not).

The early culling test or tests may be implemented, e.g., as part of the rasteriser, or after the rasteriser (but before the renderer), or as a combination of this (e.g. where there is more than one early culling test). In an embodiment it or they are implemented as part of the rasterisation process and/or after the rasteriser but before the rest of the graphics processing pipeline.

If the sampling point or points, or fragment or fragments, being tested fails the early culling test (e.g. is found to be occluded), then that sampling point or points, or fragment or fragments, is in an embodiment "culled" from further processing in the pipeline as is known in the art.

This culling can be achieved (and provided) in any desired and suitable manner. For example, where the cull test is in respect of a whole fragment (or set of plural whole fragments), then in an embodiment the fragment or set of plural fragments is not sent onwards through the pipeline for processing (e.g. for rendering) (i.e. they are "culled"), as is known in the art.

On the other hand, if the cull test is in respect of fewer than all of the sampling points associated with a fragment to be rendered, then in an embodiment further processing of the sampling points in question (i.e., that failed the cull test) is prevented (stopped), e.g., by marking the sampling points as "disabled" (e.g. by indicating them to not be covered in a coverage mask associated with the fragment in question), or in any other suitable manner, but the fragment in question is still sent onwards (through the pipeline) so that the "non-culled" sampling points associated with the fragment will still be processed.

If the at least one sampling point being tested passes the early culling test, then the sampling point (i.e. the fragment that the sampling point is associated with), the fragment, or set of plural fragments, that was tested is sent onwards for processing (e.g. towards the renderer), again as is known in the art. However, in this event, it is also determined whether the processing of another sampling point that is in the pipeline should be slowed down in response to (as a consequence of) the sampling point passing the early culling test (and if it is then determined that the processing of a sampling point that is already in the pipeline should be slowed down in response to (as a consequence of) the sampling point, etc., passing the early culling test, the processing of that sampling point is in an embodiment then slowed down).

It would be possible in this regard for process to operate at a sampling point level (resolution) (rather than, e.g. in respect of whole fragments), and thus test, and slow down the processing of, individual sampling points associated with fragments that are already in the pipeline. This may be particularly appropriate where the early culling test tests individual sampling points, and would allow, e.g. the process to "chip away" at the sampling points associated with a fragment in the pipeline (e.g. such that once all the (covered) sampling points associated with a fragment have been determined as to be "slowed down", the processing of the whole fragment could then be slowed down).

Equally, the process could be configured to also or instead operate in respect of whole fragments, i.e. such that if a whole fragment (or set of plural fragments) passes the early culling test, it is then determined whether the processing of any fragments that are in the pipeline should be slowed down. This may be particularly appropriate where the early culling test tests fragments, as well as or instead of, individual sampling points.

Thus, in an embodiment, the early culling test tests fragments, and if a fragment being tested passes the early culling test, it is then determined whether the processing of a fragment that is already in the pipeline should be slowed down as a consequence of the fragment passing the early culling test.

Similarly, the process could be configured to also or instead operate in respect of sets of plural fragments, i.e. such that if a set of plural fragments passes the early culling test, it is then determined whether the processing of any fragments and/or sets of plural fragments that are in the pipeline should be slowed down. This may be particularly appropriate where the early culling test tests sets of plural fragments, as well as or instead of, individual fragments and/or sampling points.

Thus, in an embodiment, the early culling test tests sets of plural fragments, and if a set of plural fragments being tested passes the early culling test, it is then determined whether the processing of a fragment that is already in the pipeline should be slowed down as a consequence of the set of plural fragments passing the early culling test.

Thus, in an embodiment, the early culling test tests sets of plural fragments, and if a set of plural fragments being tested passes the early culling test, it is then determined whether the processing of a set of plural fragments that is already in the pipeline should be slowed down as a consequence of the set of plural fragments passing the early culling test. In this case, each set of plural fragments is in an embodiment a set of four fragments, in an embodiment a 2×2 fragment group.

In an embodiment, the determination is carried out at the resolution of the entities that the rendering pipeline operates on, such as (and in an embodiment), fragments, or groups of plural fragments (e.g. 2×2 groups of fragments).

The determination of whether the processing should be slowed down could be in respect of only a single sampling point and/or fragment that is in the pipeline, but in an embodiment is in respect of plural sampling points and/or fragments. Thus, in an embodiment it is determined whether the processing of any one of plural sampling points and/or fragments that are already in the pipeline should be slowed down as a consequence of the at least one sampling point and/or fragment passing the early culling test.

While the operation in the manner of the technology described herein (to slow the processing of and potentially then "kill" other fragments, etc., in the graphics pipeline) could be performed in respect of each and every fragment that passes the early culling test (that is associated with a sampling point that passes the early culling test), in an embodiment it is carried out in respect of selected fragments only, in an embodiment fragments that meet certain selected, in an embodiment predetermined, criteria (and that pass the early culling test(s)).

Thus, in an embodiment the determination of whether the processing of another sampling point that is in the pipeline should be slowed down as a consequence of a sampling point passing the early culling test includes determining whether the sampling point that passed the early culling test (and/or the fragment associated with the sampling point) meets the necessary (selected) criteria for (has the necessary properties for) (potentially) slowing down the processing of another sampling point.

Thus, in an embodiment the determination of whether the processing of any other sampling points and/or fragments already in the pipeline should be slowed down is based, at least in part, on whether the fragment and/or sampling point that passes the early culling test also has a particularly, in an embodiment selected, property or properties. If the fragment, etc., does not have the property, then in an embodiment it is not determined whether the processing of another sampling point that is in the graphics processing pipeline should be slowed down in response to the at least one sampling point passing the early culling test, but if the fragment, etc., does have the property then in an embodiment it is determined that the processing of another sampling point that is in the graphics processing pipeline should not be slowed down in response to the at least one sampling point passing the early culling test (subject to any other criteria or conditions necessary or to be met for that to be done).

Thus, in an embodiment the determination of whether the processing of a sampling point and/or fragment should be slowed down or not is subject to further checks and/or criteria.

Similarly, in an embodiment, if a fragment (or sampling point) passes the early culling test other properties of the fragment(s) (or sampling point(s)) are first checked to see if the processing of the fragment(s) (or sampling point(s)) in the pipeline should (potentially) be slowed down, before slowing down its (or their) processing.

The criteria for a fragment that passes the early culling test(s) then triggering operation in the manner of the technology described herein can be any selected and suitable criteria.

In an embodiment, the particular property of the fragment and/or sampling point that is being early cull tested in this regard is whether the fragment and/or sampling point will be subjected to a conditional discard test as part of its processing (i.e. has state associated with it that indicates that the fragment and/or sampling point could be later discarded when it is processed by the graphics processing pipeline, e.g., and in an embodiment, has a conditional discard within a shader associated with it). (As is known in the art, some fragments that are to be rendered may be subjected to various conditional discard tests or conditions as part of the rendering process that could lead to those fragments (e.g.) being discarded. This may be used, for example, when rendering fences or leaves in a tree (in which case the discard is used for the spaces between the leaves/fence). It is these fragments that the technology described herein is in an embodiment applied to.)

Thus, in an embodiment the criteria include the fragment being subjected to one or more conditional discard tests as part of its processing. In an embodiment they include one or more of and in an embodiment all of: the fragment having a full RGB write mask; the fragment not having a blend function that is dependent on previous RGBA values; a shader program for the fragment not reading from the tile buffer; the fragment being fully opaque; and the fragment not being forced (by the application programmer) to perform a late depth update for a reason other than: alpha test, alpha to coverage, shader contains discard, blend shader contains discard or earlier fragments having the same position in the shader are forced to perform a late depth update.

In other words, in an embodiment fragments that are forced to perform a late depth update because of an alpha test, alpha to coverage test, shader contains discard, blend shader contains discard or earlier fragments in the shader are forced to do a late depth update, are allowed to (and used to) trigger operation in the manner of the technology described herein to (potentially) slow the processing of other fragments and/or sampling points, but fragments that are forced to perform a late depth update for any other reason are not allowed to (and not used to) trigger operation in the manner of the technology described herein to (potentially) slow the processing of other fragments and/or sampling points.

In an embodiment, the determination of whether the processing of any other sampling points and/or fragments already in the pipeline should be slowed down is based, inter alia, on whether the sampling point(s) and/or fragment(s) that have passed the culling test could overdraw (and in an embodiment whether they could occlude) sampling points and/or fragments that are already in the pipeline (since if the later sampling point(s) and/or fragments have passed, e.g., an early depth test, that should indicate that those sampling points and/or fragments could be in front of (and thus (potentially) occlude, if they are opaque) any sampling points and/or fragments representing the same position(s) that are already in the pipeline).

Thus, the determination of those sampling points and/or fragments whose processing should be slowed down in the event of an early cull test "pass" event is in an embodiment carried out by a later stage or stages of the graphics processing pipeline identifying (determining) any sampling points and/or fragments that it currently contains (e.g. is processing) that could potentially be overdrawn by the sampling point or points and/or fragment or fragments (as appropriate) that passed the early cull test.

This process may be carried out in any suitable and desired manner, but in an embodiment is done by comparing the (e.g. (x, y)) positions of one or some or all of the sampling points and/or fragments currently occupying the pipeline stage with the (e.g. (x, y)) position(s) of the sampling point(s) and/or fragment(s) that passed the early culling test.

Where sampling points (as against whole fragments) are being considered, this could be done by comparing the "actual" positions of the sampling points in question, but in an embodiment is done by comparing the positions of the fragments that represent the sampling points in question, and the relative positions of the sampling points within the fragments (e.g. based on coverage masks associated with the fragments).

Where fragments are being considered, this is in an embodiment done by comparing the positions of one or some or all of the fragments currently occupying the pipeline stage with the position(s) of the fragment(s) that passed the early culling test.

Where a set of plural fragments is being considered (i.e., has passed the early culling test), this is in an embodiment done by comparing the positions of one or some or all of the fragments or groups of fragments, currently occupying the pipeline stage with the range of positions (the area) covered by the fragments in the set of plural fragments that have passed the early culling test.

The processing of any current sampling points and/or fragments that occupy the same positions in (the plane of) the render output (i.e. that have the same (x, y) positions) as the sampling point(s) and/or fragment(s) (as appropriate) that passed the early culling test can then be, and in an embodiment are then, (selectively) slowed down (e.g. subject to other criteria for slowing down the sampling point's processing also being met). This is possible because, e.g., in the case of an early depth test, the sampling points and/or fragments already in the pipeline having the same positions can be assumed potentially to be behind the new sampling points(s) and/or fragments that passed the early culling test, and so can be treated as being potentially occluded by those later sampling points and/or fragments (if the later sampling points and/or fragments are opaque and, e.g. and in an embodiment, are not discarded as a result of some conditional discard test associated with them).

The determination of those sampling points and/or fragments whose processing should be slowed down in the event of an early cull test "pass" event, such as the comparison of the fragment positions, is in an embodiment carried out in an appropriately conservative manner, to avoid or reduce the risk of slowing down the processing of sampling points and/or fragments incorrectly or unnecessarily.

Thus, the determination that a sampling point and/or fragment should have its processing slowed down is in an embodiment configured as an appropriately conservative test (or tests), so as to reduce the risk of erroneously or unnecessarily slowing the processing of sampling points and/or fragments that should in fact be processed with normal priority.

While it would be possible simply to slow down the processing of any sampling points and/or fragments found, e.g., to be potentially overdrawn or occluded by the sampling points and/or fragment(s) that pass the early culling test (where the sampling points and/or fragments that pass the early culling test also meet any other required criteria, such as being associated with a conditional discard test), in an embodiment the determination of whether the processing of a sampling point and/or fragment should be slowed down or not is subject to further checks and/or criteria. For example, in an embodiment it is also checked whether a sampling point and/or fragment in the pipeline whose processing is potentially to be slowed down (e.g. that will potentially be occluded) should still be processed with normal priority (at normal speed) for any other reason, e.g., because it has a side effect that is needed, such as being associated with an occlusion query that it is needed for.

Thus, in an embodiment, if a fragment (or sampling point) is found potentially to be overdrawn or occluded by a fragment or fragments (or sampling point) that passes the early culling test (and, e.g., and in an embodiment, that has state associated with it that indicates that the fragment, etc., could later be discarded), other properties of the fragment(s) (or sampling point(s)) that are already in the pipeline are first checked to see if the processing of the fragment(s) (or sampling point(s)) in the pipeline can be slowed down, before slowing down its (or their) processing. This check in an embodiment comprises determining if the fragment (or sampling point) already in the pipeline is needed for an occlusion query (has an active occlusion query attached to it) or for other side effects (in which case its processing is in an embodiment not slowed down).

Thus in an embodiment, the graphics processing pipeline is configured to selectively slow down the processing of a sampling point and/or a fragment or fragments that is or are already in the pipeline in response to at least one sampling point associated with a fragment passing the early culling test.

The operation of determining whether the processing of any sampling points and/or fragments that are in the pipeline should be slowed down when a sampling point or fragment or fragments passes the early culling test can be implemented in any suitable and desired manner.

In an embodiment, the event of a sampling point or fragment or fragments passing the early culling test (and meeting any other required criteria to (potentially) slow down the processing of other fragments, etc.) triggers the broadcasting of relevant information, such as, and in an embodiment, the position of the sampling point or fragment(s) that passed the test, to other, e.g. later, stages in the processing pipeline, with those other, e.g. later, stages in an embodiment then using that information to assess whether any of the sampling points or fragments that they are currently handling should have their processing slowed down (e.g., and in an embodiment, in the manner discussed above).

Where the test is in respect of whole fragments, this position information in an embodiment comprises the (x,y) position(s) of the fragment(s) in question, as discussed above. Where the test is in respect of a set of plural fragments, this position information in an embodiment comprises the range of (x,y) positions covered by the fragments in the set of plural fragments in question (again as discussed above). Where the test is in respect of sampling points, the position information in an embodiment comprises the (x,y) position of the fragment that the sampling point(s) is associated with, together with an indication of which sampling point position for the fragment the sampling point is (in an embodiment in the form of a coverage mask, as discussed above).

Thus, in an embodiment, the graphics processing system is configured to, if at least one sampling point associated with a fragment passes the early culling test, broadcast information relating to the at least one sampling point (and/or fragment in question) that has passed the early culling test, to at least one, in an embodiment other (and in an embodiment later), stage of the graphics processing pipeline, and the at least one stage of the graphics processing pipeline is configured to use the broadcast information associated with the at least one sampling point and/or fragment that passed the early culling test to determine if the processing of any fragments and/or sampling points associated with fragments that are currently at that stage should be slowed down. As discussed above, in an embodiment the information is only broadcast to the other stages of the graphics processing pipeline if the at least one sampling point and/or fragment that passed the early culling test also meets a further criteria, such as, and in an embodiment, being subject to potentially being discarded when it is processed by the graphics processing pipeline.

As discussed above, in an embodiment the early culling test comprises an early depth test, and/or the at least one stage of the graphics processing pipeline is configured to use the broadcast information associated with the sampling point(s) and/or fragment(s) that passed the early culling test to determine if any sampling points and/or fragments that are currently at that stage will potentially be overdrawn by the sampling points(s) and/or fragments that passed the early culling test, and if any such sampling points or fragments exist, to selectively slow down the future processing of those potentially overdrawn sampling points and/or fragments.

Thus, in an embodiment, the graphics processing pipeline is configured to:
perform an early depth test for at least one sampling point associated with a fragment generated by the rasteriser before the fragment is sent onwards through the pipeline for processing;
if the at least one sampling point passes the early depth test (and, in an embodiment, if the at least one sampling point is subject to potentially being discarded when it is processed by the graphics processing pipeline), send the fragment onwards for processing and broadcast information relating to the at least one sampling point that has passed the early depth test to at least one, in an embodiment later, stage of the graphics processing pipeline; and
the at least one stage of the graphics processing pipeline is configured to use the broadcast information associated with the at least one sampling point that passed the early depth test to determine if any sampling points that are currently at that stage will potentially be overdrawn by the at least one sampling point that passed the early depth test, and if any such sampling points exist, to selectively slow down the further processing of those potentially overdrawn sampling points.

Similarly, in an embodiment, the graphics processing pipeline is configured to:
perform an early depth test for at least one fragment generated by the rasteriser before the at least one fragment is sent onwards through the pipeline for processing;
if the at least one fragment passes the early depth test (and, in an embodiment, if the at least one sampling point is subject to potentially being discarded when it is processed by the graphics processing pipeline), send the at least one fragment onwards through the pipeline for processing and broadcast information relating to the at least one fragment that has passed the early depth test to at least one, in an embodiment later, stage of the graphics processing pipeline; and the at least one stage of the graphics processing pipeline is configured to use the broadcast information associated with the at least one fragment that passed the early depth test to determine if any fragments that are currently at that stage will potentially be overdrawn by the at least one fragment that passed the early depth test, and if any such fragments exist, to selectively slow down future processing of those potentially overdrawn fragments.

As discussed above, in an embodiment the information that is broadcast to the stage(s) of the graphics processing pipeline comprises the position(s) of the sampling point(s) and/or fragment(s) that passed the early culling test, and/or the at least one stage of the graphics processing pipeline is configured to use the broadcast position information associated with the sampling point(s) and/or fragment(s) that passed the early culling test to determine if any sampling points and/or fragments that are currently at that stage occupy the same position in the render target (destination buffer), e.g. tile being processed, as the sampling points(s) and/or fragments that passed the early culling test, and to selectively slow down the future processing of any sampling points and/or fragments that occupy the same position in the render target as the sampling points(s) and/or fragments that passed the early culling test.

Thus, in an embodiment, the graphics processing pipeline is configured to:

perform an early depth test for at least one sampling point associated with a fragment generated by the rasteriser before the fragment is sent onwards through the pipeline for processing;

if the at least one sampling point passes the early depth test (and, in an embodiment, if the at least one sampling point is subject to potentially being discarded when it is processed by the graphics processing pipeline), send the fragment onwards for processing and broadcast information relating to the position of the at least one sampling point that has passed the early depth test to at least one, in an embodiment later, stage of the graphics processing pipeline; and the at least one stage of the graphics processing pipeline is configured to use the broadcast position information associated with the at least one sampling point that passed the early depth test to determine if any sampling points that are currently at that stage occupy the same position as the at least one sampling point that passed the early depth test, and if any such sampling points exist, to selectively slow down further processing of those sampling points that occupy the same position as the at least one sampling point that passed the early depth test.

Similarly, in an embodiment, the graphics processing pipeline is configured to:

perform an early depth test for at least one fragment generated by the rasteriser before the at least one fragment is sent onwards through the pipeline for processing;

if the at least one fragment passes the early depth test (and, in an embodiment, if the at least one sampling point is subject to potentially being discarded when it is processed by the graphics processing pipeline), send the at least one fragment onwards through the pipeline for processing and broadcast information relating to the position of the at least one fragment that has passed the early depth test to at least one, in an embodiment later, stage of the graphics processing pipeline; and the at least one stage of the graphics processing pipeline is configured to use the broadcast position information associated with the at least one fragment that passed the early depth test to determine if any fragments that are currently at that stage occupy the same position as the at least one fragment that passed the early depth test, and if any such fragments exist, to selectively slow down future processing of those fragments that occupy the same position as the at least one sampling point that passed the early depth test.

The stage or stages of the processing pipeline where it is determined whether the processing of any sampling points and/or fragments can be slowed down in the event of an early culling test "pass" event can comprise any desired and suitable stages of the graphics processing pipeline. In an embodiment they comprise at least one later stage of the graphics processing pipeline (i.e., a stage that is after the early culling test and/or rasteriser). The processing pipeline can be divided into many stages as is desired for this purpose.

In an embodiment this stage is (this determination is done by) the renderer of the graphics processing pipeline. It would be possible, e.g., for the renderer to be treated as a single stage which operates in the manner of the technology described herein as a whole, or for it to be treated as, and divided into, plural separate stages that each act independently of one another. Thus, in an embodiment, the early culling test "pass" event information is broadcast to (at least to) the renderer and/or to a part or parts of the renderer of the graphics processing pipeline (with the renderer or part or parts of the renderer then operating in the manner of the technology described herein).

The stage or stages of the processing pipeline where it is determined whether the processing of any sampling points or fragments can be slowed down in the event of an early culling test "pass" event could also or instead comprise other stages of the pipeline, e.g., where fragments could usefully be culled, if desired. For example, where an or the early culling test is itself arranged in an iterative or pipelined fashion, then an early culling test "pass" event could also or instead be broadcast to that early culling test, so as to try to slow the processing of, e.g., fragments, that are still undergoing the early culling test (e.g. that are later on in the early culling test pipeline), if desired.

Similarly, where the rasteriser operates in an iterative or pipelined fashion (as discussed above), then the early culling test "pass" events are in an embodiment broadcast to the rasteriser, so as to try to slow the processing of, e.g. earlier fragments (and/or patches of fragments) that are still undergoing rasterisation (that have not yet been completely rasterised). Thus, in an embodiment, the early culling test pass event information is provided to the rasteriser, with the rasteriser then determining if any patches of sampling points, fragments and/or sampling points still being rasterised can have their processing slowed down in view of that.

Each stage of the graphics processing pipeline that is operable in the manner of the technology described herein could test its sampling points and/or fragments one at a time, for example. However, in an embodiment, plural fragments (and in an embodiment all of the fragments in the stage) and/or sampling points can be tested in parallel. This then facilitates taking advantage efficiently of early cull testing that can test, e.g., patches of plural fragments at a time. In an embodiment the arrangement is such that the pipeline stages can slow the processing of, etc., sampling points and fragments at the same rate as which early cull testing pass events can generate potential "slowing down" opportunities.

As discussed above, where it is determined that a sampling point and/or fragment should have its processing slowed down, then in an embodiment the processing of the fragment and/or sampling point by the pipeline is slowed down.

A "slowed down" fragment, etc., should be processed more slowly than it would normally be, but the extent to which the processing of a sampling point(s) and/or fragment is slowed down can be selected as desired. It should be noted here that the intent is that the processing of the sampling point(s) and/or fragment is slowed down or delayed relative to the speed at which it would normally be processed through the pipeline, not that the sampling point(s) and/or fragment is at the time it is "slowed down" discarded (permanently stopped) from being processed further by the pipeline. Thus, while the processing of the fragment, etc., is slowed down, the fragment, etc., is not (at the time it is slowed down) discarded from further processing by the pipeline.

In an embodiment, the arrangement is such that the "slowed down" fragment's, etc., processing is slowed to the extent that the sampling points or fragment that triggered the slowing down of the processing of the fragment or sampling point in question overtakes the "slowed down" fragment or sampling point in the pipeline, and in an embodiment such that the processing of the sampling point(s) or fragment that triggered the slowing down of the processing of the fragment or sampling point in question should (and in an embodiment does) complete the conditional discard or tests before the completion of the processing of the "slowed down" fragment or sampling point in the pipeline. As will be discussed below, this then allows the "triggering" fragment or sampling point to be used to (potentially) discard ("kill") the slowed down fragment, etc., from further processing by the pipeline.

Thus, in an embodiment, the slowing down of the processing of a fragment and/or sampling point(s) in the pipeline comprises delaying the processing of the fragment and/or sampling point in the pipeline such that the sampling point(s) or fragment that triggered the slowing down of the processing of the fragment or sampling point in question overtakes the "slowed down" fragment or sampling point in the pipeline, and in an embodiment such that the sampling point(s) or fragment that triggered the slowing down of the processing of the fragment or sampling point in question should complete its conditional discard test or tests in the pipeline before the "slowed down" fragment or sampling point.

The sampling points and/or fragments whose processing it is determined should be slowed down can have their processing slowed down in any desired and suitable fashion.

In one embodiment, the fragments and/or sampling points, whose processing is to be slowed down, have their processing slowed down by pausing their processing by the pipeline (e.g., and in an embodiment, until the "triggering" fragment and/or sampling point has completed its conditional discard test or tests). Thus, in an embodiment, the slowing down of the processing of a fragment and/or sampling point(s) in the pipeline comprises pausing the processing of the fragment and/or sampling point in the pipeline, in an embodiment such that the sampling point(s) or fragment that triggered the slowing down of the processing of the fragment or sampling point in question overtakes the "slowed down" fragment or sampling point in the pipeline, and in an embodiment such that the sampling points or fragment that triggered the slowing down of the processing of the fragment or sampling point in question should complete its conditional discard test or tests in the pipeline before the "slowed down" fragment or sampling point.

Such pausing of the processing of a fragment, etc., in the pipeline can be achieved as desired. In one embodiment, the paused fragments, etc., are placed in a "zombie pool" where their processing is paused.

In another embodiment, the fragments and/or sampling points whose processing is to be slowed down have their processing slowed down by de-prioritising their processing by the pipeline (i.e. by reducing their priority for processing by the pipeline), e.g., and in an embodiment, by giving the "slowed down" fragments less priority for cache accesses and/or other processing by the pipeline (relative to fragments, etc., that have not been slowed down). Thus, in an embodiment, the slowing down of the processing of a fragment and/or sampling point(s) in the pipeline comprises de-prioritising (reducing the priority of) the processing of the fragment and/or sampling point in the pipeline, in an embodiment such that the sampling points or fragment that triggered the slowing down of the processing of the fragment or sampling point in question overtakes the "slowed down" fragment or sampling point in the pipeline, and in an embodiment such that the sampling points or fragment that triggered the slowing down of the processing of the fragment or sampling point in question should complete their conditional discard test or tests in the pipeline before the "slowed down" fragment or sampling point.

Such de-prioritisation of the processing of a fragment, etc., by the pipeline can be achieved or desired.

In an embodiment, fragments having instructions to be processed are placed in a fragment pool when an instruction is completed, and when there are cache hits and instructions are otherwise ready for execution, the appropriate fragments are taken out of the fragment pool and executed. Fragments then have their priority for processing reduced by adding a priority condition as an additional factor to be considered when determining whether a fragment should be allowed to exit the fragment pool or not.

In an embodiment, the fragments, etc., are de-prioritised by marking the so-identified sampling points and/or fragments as being "de-prioritised" (as having a reduced priority for processing). The relevant processing stages may then, e.g., check if a sampling point and/or fragment has been de-prioritised before doing any processing on it, and then processing the fragment, etc., with normal or a reduced priority, accordingly. This will then slow down the processing of the de-prioritised sampling points and/or fragments.

In the case of sampling points, a sampling point is in an embodiment marked as de-prioritised by setting a value in metadata, such as a sampling point mask, for the fragment in question appropriately.

When fragments as a whole are to be considered, each fragment could, e.g., have a "de-prioritised" bit associated with it (e.g. as part of its associated fragment data), which if set indicates that processing of the fragment has been de-prioritised. In one embodiment this is what is done. The processing stages may then, e.g., check the "de-prioritised" bit of each fragment they receive for processing. This bit could also be set if the testing of individual sampling points ultimately de-prioritises all the sampling points associated with a fragment.

Alternative arrangements, such as having a fragment queue with de-prioritised tags that operates like a cache to release queue (cache) lines if a fragment's de-prioritised tag is set could instead or also be used if desired.

Once a fragment and/or sampling point has triggered the slowing down of other fragments, etc., that are already in the pipeline, then in an embodiment, once such a triggering fragment has completed (and passed) all the discard conditions that it could be subjected to (i.e. has performed all its conditional discard tests and not been discarded) it is then further determined whether the processing of any earlier fragments, etc., that are still in the pipeline can be stopped (e.g. on the basis that it is then known that the "triggering" fragment, etc., will occlude those other fragments, etc. (because it hasn't been and won't be discarded)). This could be done, e.g., once the "triggering" fragment has completed its processing by the pipeline, and/or once it has undergone (and passed) its final conditional discard test.

Thus, in an embodiment if a sampling point and/or fragment that has previously triggered the slowing down of the processing of the other fragments and/or sampling point(s) in the pipeline passes all its associated conditional discard tests (i.e. is not discarded), it is then determined if the processing of another sampling point and/or fragment that is being processed in the graphics processing pipeline can be stopped.

This then means that the results of the fragment passing all its conditional discard tests can be used to avoid and/or stop processing (to "kill") sampling points for earlier primitives that are still in the pipeline.

It should be noted here that this operation, when used in combination with the operation of the technology described herein to slow or delay the processing of fragments, etc., that could potentially be occluded by a fragment following the early culling test, means that the result of the "slowing down" triggering fragment passing its conditional discard test(s) can then be used, for example, to "kill" off any "slowed fragments" that the triggering fragment has overtaken in the pipeline and that will in fact be occluded by the triggering fragment before those slowed fragments are fully processed by the pipeline. This then allows later fragments to be used to perform hidden surface removal in relation to earlier fragments that were in front of the later fragment in the pipeline even where it could not be determined with sufficient certainty at the early culling test (e.g. depth test) stage whether the new fragment (e.g.) would actually occlude a fragment that is already in the pipeline.

Thus the technology described herein can be used, for example, and unlike the prior art techniques, to reduce or avoid "overdraw" in the situation where a primitive and/or fragment is in fact occluded by a later primitive in the rendering order. The effect of this is that the technology described herein can further reduce the extent to which hidden surfaces are unnecessarily processed in the graphics processing pipeline, as compared, e.g., to existing early-depth testing techniques.

The Applicants have further recognised that this operation will be more effective, the more "slowed down" fragments that are already in the pipeline, the new, triggering fragment, etc., can overtake in the pipeline. Thus, as discussed above, in an embodiment the slowing down of the processing of the fragments, etc., is such as to allow the triggering fragment to overtake some, and in an embodiment all, of the fragments, etc., it "slows down".

It is believed that the idea of using the result of a sampling point and/or fragment passing conditional discard tests in a graphics processing pipeline to see if the processing of fragments, etc., that are earlier in the pipeline can be stopped may be novel and advantageous in its own right.

Thus, another embodiment of the technology described herein comprises a method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:

performing a conditional discard test in respect of at least one sampling point associated with a fragment generated by the rasteriser; and if the at least one sampling point passes the conditional discard test, sending the fragment onwards in the pipeline and determining if the processing of another sampling point that is in the graphics processing pipeline can be stopped as a consequence of the at least one sampling point passing the conditional discard test.

Another embodiment of the technology described herein comprises a graphics processing pipeline comprising:

a plurality of processing stages including a rasteriser that rasterises input primitives to generate graphics fragments to be processed, each graphics fragment having one or more sampling points associated with it, a renderer that processes fragments generated by the rasteriser to generate output fragment data, and in which:

conditional discard tests in respect of sampling points associated with fragments generated by the rasteriser may be performed; and wherein the graphics processing pipeline is configured to:

in response to at least one sampling point associated with a fragment generated by the rasteriser passing a conditional discard test, send the fragment onwards in the pipeline and determine if the processing of another sampling point that is in the graphics processing pipeline can be stopped as a consequence of the at least one sampling point passing the conditional discard.

The conditional discard test that this operation of the technology described herein uses may comprise any suitable such testing, such as of the form used when rendering leaves or fences.

Any or all of the available conditional discard tests (conditional discard testing stages) of the graphics processing pipeline can be configured to operate in (to trigger operation in) this manner. In an embodiment the determination is only made once a fragment, etc., has passed the final conditional discard test that it is to be subjected to.

The conditional discard test or tests themselves can be carried out in any suitable and desired manner, e.g., in the normal manner known in the art and/or used in the graphics processing system in question.

On the other hand, if a sampling point or points, or fragment or fragments, that triggered the slowing down of the processing of other fragments, etc., in the pipeline fails a conditional discard test that it is to be subjected to (i.e. is discarded as a result of a conditional discard test), then the Applicants have recognised that it will not be possible to discard safely any fragments, etc., in the pipeline that the fragment in question slowed down (as because the triggering fragment has been discarded that triggering fragment, etc., will not in fact occlude the "slowed down" fragments). In this case therefore, any fragments, etc., that were slowed down as a result of the fragment, etc., in question passing the early culling test should still continue to be, and are in an embodiment still, processed by the graphics processing pipeline.

In this case, the "slowed down" fragments, etc., could simply be left to be continued to be processed at a slower rate. However, in an embodiment, the "slowed down" fragments, etc., are restored to be processed at a higher (and in an embodiment at the normal) priority (they are "revived"), if the fragment, etc., that triggered the slowing of their processing is subsequently discarded. In an embodiment this is also done if the triggering fragment, etc., is discarded ("killed") for any other reason, e.g. by virtue of the operation of the technology described herein.

Thus, embodiments of the technology described herein further comprise if the at least one sampling point fails a conditional discard test (is discarded), discarding the at least one sampling point that failed the conditional discard test, and determining if the processing of another sampling point that is in the graphics processing pipeline should be revived as a consequence of the at least one sampling point failing the conditional discard test.

Similarly, the graphics processing pipeline is in an embodiment further configured to, in response to at least one sampling point failing a conditional discard test, discard the at least one sampling point that failed the conditional discard test, and determine if the processing of another sampling point that is in the graphics processing pipeline should be revived as a consequence of the at least one sampling point failing the conditional discard test.

Such "reviving" of previously slowed down fragments, etc., can be achieved as desired. In an embodiment, it is achieved by the sending of a "revive" signal that will trigger the appropriate "revival" of the fragments, etc., in question.

These "killing" and "reviving" processes could operate at a sampling point level (resolution) (rather than, e.g. in respect of whole fragments), and thus test, and stop from further processing, or revive, individual sampling points associated with fragments that are earlier in the pipeline. This may be particularly appropriate where the conditional discard test tests individual sampling points, and would allow, e.g. the process to "chip away" at the sampling points associated with a fragment that is still in the pipeline (e.g. until all its sampling points have been "stopped" (or revived), at which point the whole fragment could then be discarded (or "revived")).

Equally, the process could be configured to also or instead operate in respect of whole fragments, i.e. such that if a whole fragment (or set of plural fragments) passes the (final) conditional discard test, it is then determined whether the processing of any fragments that are still in the pipeline can be stopped. This may be particularly appropriate where the conditional discard test tests fragments, as well as or instead of, individual sampling points.

In an embodiment, if a fragment being tested passes (or fails) the conditional test as a whole, it is then determined whether the processing of a fragment that is earlier in the pipeline can be stopped (or revived, respectively) as a consequence of the fragment passing (or failing) the conditional discard test.

In an embodiment, the determination is carried out at the resolution of the entities that the rendering pipeline operates on, such as (and in an embodiment), fragments.

The determination of whether the processing can be stopped (or revived) could be in respect of only a single sampling point and/or fragment that is in the pipeline, but in an embodiment is in respect of plural sampling points and/or fragments. Thus, in an embodiment it is determined whether the processing of any one of plural sampling points and/or fragments that are earlier in the pipeline can be stopped (or revived) as a consequence of the at least one sampling point and/or fragment passing (or failing, respectively) the conditional discard test.

The determination of whether the processing of any other sampling points and/or fragments earlier in the pipeline can be stopped can be based on any desired and suitable criteria. In an embodiment, it is based on whether the sampling point(s) and/or fragment(s) that have passed all their conditional discard tests will overdraw (and in an embodiment whether they will occlude) sampling points and/or fragments that are in the pipeline (since if the sampling point(s) and/or fragments have passed all their conditional discard tests (and the early depth test) that should indicate that those sampling points and/or fragments will be in front of (and thus occlude, if they are opaque) any sampling points and/or fragments representing the same position(s) that entered the pipeline before them).

Thus, the determination of those sampling points and/or fragments that need no longer be processed in the event of a conditional discard test "pass" event is in an embodiment carried out by a stage or stages of the graphics processing pipeline identifying (determining) any sampling points and/or fragments that it currently contains (e.g. is processing) that will be overdrawn by the sampling point or points and/or fragment or fragments (as appropriate) that passed the conditional discard test.

The determination of whether the processing of any other sampling points and/or fragments in the pipeline can be revived can similarly be based on any desired and suitable criteria. In an embodiment, it is based on whether the slowed down sampling point(s) and/or fragment(s) that are in the pipeline can no longer be overdrawn (and in an embodiment whether they can no longer be occluded) by the sampling points and/or fragments that have failed the conditional discard test (since if the sampling point(s) and/or fragments have failed a conditional discard test and been discarded, that will mean that those sampling points and/or fragments won't be in front of (and thus won't occlude, if they are opaque) any sampling points and/or fragments representing the same position(s) that entered the pipeline before them).

Thus, the determination of those sampling points and/or fragments that can be revived in the event of conditional discard test "fail" event is in an embodiment carried out by a stage or stages of the graphics processing pipeline identifying (determining) any sampling points and/or fragments that it currently contains (e.g. is processing) that can't now be overdrawn by the sampling point or points and/or fragment or fragments (as appropriate) that failed the conditional discard test.

These processes may be carried out in any suitable and desired manner, but in an embodiment are done by comparing the (e.g. (x, y)) positions of one or some or all of the sampling points and/or fragments currently occupying the pipeline stage with the (e.g. (x, y)) position(s) of the sampling point(s) and/or fragment(s) that passed (or failed) the conditional discard test.

Where sampling points (as against whole fragments) are being considered, this could be done by comparing the "actual" positions of the sampling points in question, but in an embodiment is done by comparing the positions of the fragments that represent the sampling points in question, and the relative positions of the sampling points within the fragments (e.g. based on coverage masks associated with the fragments).

Where fragments are being considered, this is in an embodiment done by comparing the positions of one or some or all of the fragments currently occupying the pipeline stage with the position(s) of the fragment(s) that passed or failed the conditional discard test.

Where a set of plural fragments is being considered (e.g., has passed the late culling test), this is in an embodiment done by comparing the positions of one or some or all of the fragments currently occupying the pipeline stage with the range of positions (the area) covered by the fragments in the set of plural fragments that have passed the conditional discard test.

The process of determining whether fragments, etc., should be "killed" or "revived" is in an embodiment performed in respect of fragments, etc., that are "older" than (that were already in the pipeline before) the fragment, etc., that triggered their slowing down. Primitives (and thus fragments and/or sampling points) to be processed may be associated with time stamps to facilitate this.

The processing of any older sampling points and/or fragments that occupy the same positions in (the plane of) the render output (i.e. that have the same (x, y) positions) as the sampling point(s) and/or fragment(s) (as appropriate) that passed (or failed) the conditional discard test can then be, and in an embodiment is then, (selectively) stopped (or revived, respectively) (e.g. subject to other criteria for stopping (or reviving) the sampling point's processing also being met).

The determination of those sampling points and/or fragments that need no longer be processed (or that should be revived) in the event of a conditional discard test "pass" (or "fail") event, such as the comparison of the fragment positions, is in an embodiment carried out in an appropriately conservative manner, to avoid or reduce the risk of incorrectly discarding (or reviving) sampling points and/or fragments from further processing.

While it would be possible simply to discard (stop the processing of) any sampling points and/or fragments found, e.g., to be overdrawn or occluded by the sampling points and/or fragment(s) that pass the conditional discard test, in an embodiment the determination of whether a sampling point and/or fragment can be discarded from further processing or not is subject to further checks and/or criteria. For example, in an embodiment it is also checked whether a sampling point and/or fragment in the pipeline potentially to be discarded (e.g. that will be occluded) should still be processed for any other reason, e.g., because it has a side effect that is still needed, such as being associated with an occlusion query that it is still needed for Thus, in an embodiment, if a fragment (or sampling point) is found to be overdrawn or occluded by a fragment or fragments (or sampling point) that passes a (its final) conditional discard test, other properties of the fragment (or sampling point) are first checked to see if the fragment (or sampling point) should still be processed, before stopping its processing. In an embodiment, this check comprises determining if the fragment (or sampling point) is still needed for an occlusion query (has an active occlusion query attached to it) or for other side effects (in which case it should not be discarded).

Thus in an embodiment, the graphics processing pipeline is configured to selectively stop the processing of a sampling point and/or a fragment or fragments that is or are already in the pipeline in response to at least one sampling point associated with a fragment passing a conditional discard test.

The operation of determining whether the processing of any sampling points and/or fragments that are in the pipeline can be stopped or revived when a sampling point or fragment or fragments passes or fails a conditional discard test can be implemented in any suitable and desired manner.

In an embodiment, the event of a sampling point or fragment or fragments passing and/or failing a conditional discard test triggers the broadcasting of relevant information, such as, and in an embodiment, the position of the sampling point or fragment(s) that passed (or failed) the test, to other, e.g. earlier, stages in the processing pipeline, with those other, e.g. earlier, stages in an embodiment then using that information to assess whether any of the sampling points or fragments that they are currently handling can have their processing stopped or revived (e.g., and in an embodiment, in the manner discussed above).

Where the test is in respect of whole fragments, this position information in an embodiment comprises the (x,y) position(s) of the fragment(s) in question, as discussed above. Where the test is in respect of a set of plural fragments, this position information in an embodiment comprises the range of (x,y) positions covered by the fragments in the set of plural fragments in question (again as discussed above). Where the test is in respect of sampling points, the position information in an embodiment comprises the (x,y) position of the fragment that the sampling point(s) is associated with, together with an indication of which sampling point position for the fragment the sampling point is (in an embodiment in the form of a coverage mask, as discussed above).

The broadcast information in an embodiment also includes a timestamp indicating the "age" of the fragment, etc. that underwent the conditional discard test (and so triggered the broadcasting of the information) and/or an indication of whether the signal is a "revive" or "kill" ("stop processing") signal.

Thus, in an embodiment, the graphics processing system is configured to, if at least one sampling point associated with a fragment that previously triggered the slowing down of a sampling point and/or fragment in the pipeline passes its final conditional discard test, broadcast information relating to the at least one sampling point (and/or fragment) in question that has passed the conditional discard test, to at least one, in an embodiment other (and in an embodiment earlier), stage of the graphics processing pipeline, and the at least one stage of the graphics processing pipeline is configured to use the broadcast information associated with the at least one sampling point and/or fragment that passed the conditional discard test to determine if the processing of any fragments and/or sampling points associated with fragments that are currently at that stage can be stopped.

Similarly, in an embodiment, the graphics processing system is configured to, if at least one sampling point associated with a fragment that previously triggered the slowing down of a sampling point and/or fragment in the pipeline fails a conditional discard test, broadcast information relating to the at least one sampling point (and/or fragment in question) that has failed the conditional discard test, to at least one, in an embodiment other (and in an embodiment earlier), stage of the graphics processing pipeline, and the at least one stage of the graphics processing pipeline is configured to use the broadcast information associated with the at least one sampling point and/or fragment that failed the conditional discard test to determine if the processing of any fragments and/or sampling points associated with fragments that are currently at that stage can be revived.

In an embodiment the graphics processing pipeline is configured to do both of these things (i.e. each fragment that previously triggered the slowing down of a sampling point and/or fragment in the pipeline will trigger the broadcast of either a "revive" or a "kill" signal, depending upon the outcome of the conditional discard test(s) that it undergoes).

Thus, in an embodiment, the graphics processing pipeline is configured to:
    perform a conditional discard test for at least one sampling point associated with a fragment generated by the rasteriser that previously triggered the slowing down of a sampling point and/or fragment in the pipeline;
    if the at least one sampling point passes the conditional discard test, broadcast information relating to the at least one sampling point that has passed the conditional discard test to at least one, in an embodiment earlier, stage of the graphics processing pipeline; and
    the at least one stage of the graphics processing pipeline is configured to use the broadcast information associated with the at least one sampling point that passed the conditional discard test to determine if any sampling points that are currently at that stage will be overdrawn by the at least one sampling point that passed the conditional discard test, and if any such sampling points exist, to selectively stop further processing of those overdrawn sampling points.

Similarly, in an embodiment, the graphics processing pipeline is configured to:

perform a conditional discard test for at least one sampling point associated with a fragment generated by the rasteriser that previously triggered the slowing down of a sampling point and/or fragment in the pipeline;

if the at least one sampling point fails the conditional discard test, broadcast information relating to the at least one sampling point that has failed the conditional discard test to at least one, in an embodiment earlier, stage of the graphics processing pipeline; and the at least one stage of the graphics processing pipeline is configured to use the broadcast information associated with the at least one sampling point that failed the conditional discard test to determine if any sampling points that are currently at that stage won't be overdrawn by the at least one sampling point that failed the conditional discard test, and if any such sampling points exist, to selectively revive the processing of those sampling points.

As discussed above, in an embodiment the information that is broadcast to the stage(s) of the graphics processing pipeline comprises the position(s), and in an embodiment the age, of the sampling point(s) and/or fragment(s) that passed (or failed) the conditional discard test, and/or the at least one stage of the graphics processing pipeline is configured to use the broadcast position information associated with the sampling point(s) and/or fragment(s) that passed or failed the conditional discard test to determine if any sampling points and/or fragments that are currently at that stage occupy the same position in the render target (destination buffer), e.g. tile being processed, as the sampling points(s) and/or fragments that passed or failed the conditional discard test, and to selectively stop or revive, respectively, the future processing of any sampling points and/or fragments that occupy the same position in the render target as the sampling points(s) and/or fragments that passed or failed, respectively, the conditional discard test.

The stage or stages of the processing pipeline where it is determined whether any sampling points and/or fragments need no longer be processed or should be revived in the event of a conditional discard test "pass" or "fail" event, respectively, can comprise any desired and suitable stages of the graphics processing pipeline. In an embodiment they comprise at least the stage or stages of the graphics processing pipeline where it can be determined whether the processing of a fragment, etc., should be slowed down as a result of a sampling point passing the early culling test or tests. The processing pipeline can be divided into many stages as is desired for this purpose.

Each stage of the graphics processing pipeline that is operable in the manner of the technology described herein could test its sampling points and/or fragments one at a time, for example. However, in an embodiment, plural fragments (and in an embodiment all of the fragments in the stage) and/or sampling points can be tested in parallel. This then facilitates taking advantage efficiently of conditional discard testing that can test, e.g., patches of plural fragments at a time. In an embodiment the arrangement is such that the pipeline stages can discard or revive, etc., sampling points and fragments at the same rate as which conditional discard testing pass and fail events can generate potential culling and reviving opportunities.

The sampling points and/or fragments whose processing it is determined may be stopped can have their processing stopped and/or omitted in any desired and suitable fashion. In an embodiment this is done by marking the so-identified sampling points and/or fragments as being "killed" (invalid), with the relevant processing stages then checking if a sampling points and/or fragment has not been killed (is valid) before doing any further processing on it. This will then avoid and/or stop any unnecessary processing of these sampling points and/or fragments.

Where individual sampling points are to be considered, a sampling point is in an embodiment marked as invalid by setting its value in a coverage mask for the fragment in question appropriately.

When fragments as a whole are to be considered, each fragment could, e.g., have a "killed" ("invalid") bit associated with it (e.g. as part of its associated fragment data), which if set indicates that the fragment need not be processed (and can be discarded). In one embodiment this is what is done. The processing stages may then, e.g., check the invalid bit of each fragment they receive for processing. This bit could also be set if the testing of individual sampling points ultimately invalidates all the sampling points associated with a fragment.

Alternative arrangements, such as having a fragment queue with validity tags that operates like a cache to release queue (cache) lines if a fragment's invalid tag is set could instead or also be used if desired.

Although any "killed" fragment could remain in the pipeline (but not be processed), in an embodiment, steps are taken to remove invalid fragments from the pipeline. In an embodiment this is done by providing one or more compaction stages in the pipeline that are operable to remove any invalid fragments from the pipeline (that they receive). Such a compaction stage could comprise, for example, a FIFO (first-in, first-out) queue that operates to remove any invalid fragments (to clear out any holes) as the fragments work their way through the FIFO.

In the case of sampling points and/or fragments whose processing it is determined should be "revived", then that can be done in any desired and suitable fashion. This may depend, e.g., on how the fragment's, etc., processing has been slowed down in the first place.

In an embodiment, a fragment, etc., is revived by increasing its priority for processing (from, and relative to, its "slowed down", de-prioritised state). In an embodiment the fragment, etc., is restored to its original (the normal) processing priority and speed.

Where the fragments and/or sampling points whose processing is to be slowed down, have their processing slowed down by pausing their processing by the pipeline, the fragments and/or sampling points are in an embodiment revived by "unpausing" their processing. Thus, in an embodiment, the reviving of the processing of a fragment and/or sampling point(s) in the pipeline comprises unpausing (no longer pausing) the processing of the fragment and/or sampling point in the pipeline.

In one embodiment, the paused fragments, etc., to be "revived" are removed from the "zombie pool" where their processing was paused and returned to the pipeline for processing in the normal manner.

Where the fragments and/or sampling points whose processing is to be slowed down have their processing slowed down by de-prioritising their processing by the pipeline by marking the so-identified sampling points and/or fragments as being "de-prioritised" (as having a reduced priority for processing), then the fragments and/or sampling points are in an embodiment revived by no longer marking the sampling and/or fragments as being "de-prioritised". Thus, the appropriate "de-prioritised" metadata, such as a sampling point mask, and/or "de-prioritised" bit associated with a fragment, is in an embodiment updated (changed) appropriately.

Similarly, where a fragment queue with de-prioritised tags that operates like a cache to release queue (cache) lines if a fragment's de-prioritised tag is set is being used, the de-prioritised tags could be updated appropriately when a fragment, etc., is to be revived.

It will be appreciated from the above, that in an embodiment, a fragment and/or sampling point, if it passes the early culling (e.g. depth) test and sends a signal that triggers the slowing down of the processing of one or more fragments, etc., that are already in the pipeline, will then, if it passes all the conditional discard tests it is to be subjected to, send a signal that triggers the stopping of the processing of (the discarding of) one or more of the fragments, etc., whose processing it had previously slowed down, and will if it fails a conditional discard test it is to be subjected to, send a signal that triggers the reviving of the processing of one or more of the fragments, etc., whose processing it had previously slowed down.

Thus, in an embodiment, the graphics processing pipeline of the technology described herein is configured to (and the method of the technology described herein comprises):

perform an early culling test in respect of at least one sampling point associated with a fragment generated by the rasteriser before the fragment is sent to the renderer for processing;

if the at least one sampling point passes the early culling test and is to be subjected to at least one conditional discard test in the graphics processing pipeline, send the fragment onwards for processing and determine if the processing of another sampling point that is in the graphics processing pipeline should be slowed down;

perform one or more of the conditional discard tests in respect of the at least one sampling point associated with the fragment that was sent onwards for processing; and if the at least one sampling point passes all the conditional discard tests it is to be subjected to, send the fragment onwards, and; if it was determined that the processing of another sampling point that is in the graphics processing pipeline should be slowed down as a consequence of the at least one sampling point passing the early culling test, determine if the processing of another sampling point can be stopped as a consequence of the at least one sampling point passing all the conditional discard tests; and if the at least one sampling point fails a conditional discard test it was to be subjected to, and if it was determined that the processing of another sampling point that is in the graphics processing pipeline should be slowed down as a consequence of the at least one sampling point passing the early culling test, determine if the processing of another sampling point should be revived as a consequence of the at least one sampling point failing the conditional discard test.

It will also be appreciated from the above that a fragment and/or sampling whose processing has previously been slowed down will subsequently have its processing either stopped or revived, depending on the outcome of the processing of the fragment and/or sampling point that triggered the slowing down of the sampling point and/or fragment in the first place.

Thus, in an embodiment, where a fragment and/or sampling point has had its processing slowed down as a consequence of another sampling point and/or fragment passing the early culling test, the processing of that slowed down fragment or sampling point is subsequently stopped or revived, in an embodiment in dependence on the processing of the sampling point and/or fragment that triggered the slowing down of the processing of the fragment and/or sampling point, and in an embodiment in dependence on the result of a conditional discard test on the sampling point and/or fragment that triggered the slowing down of the processing of the fragment and/or sampling point.

As discussed above, the operation in the manner of the technology described herein (to slow the processing of and potentially then "kill" other fragments, etc., in the graphics pipeline) is in an embodiment carried out in respect of selected fragments only, in an embodiment fragments that meet certain selected, in an embodiment predetermined, criteria (and that pass the early culling test(s)).

Thus, in an embodiment the determination of whether the processing of another sampling point that is in the pipeline should be slowed down as a consequence of a sampling point passing the early culling test includes determining whether the sampling point that passed the early culling test (and/or the fragment associated with the sampling point) meets the necessary (selected) criteria for (has the necessary properties for) (potentially) slowing down the processing of another sampling point.

The criteria for a fragment that passes the early culling test(s) then triggering operation in the manner of the technology described herein can be any selected and suitable criteria. As discussed above, these criteria in an embodiment include the fragment being subjected to one or more conditional discard tests as part of its processing. In an embodiment they include one or more of and in an embodiment all of: the fragment having a full RGB write mask; the fragment not having a blend function that is dependent on previous RGBA values; a shader program for the fragment not reading from the tile buffer; the fragment being fully opaque; and the fragment not being forced (by the application programmer) to perform a late depth update for a reason other than: alpha test, alpha to coverage, shader contains discard, blend shader contains discard or earlier fragments having the same position in the shader are forced to perform a late depth update.

In other words, in an embodiment fragments that are forced to perform a late depth update because of an alpha test, alpha to coverage test, shader contains discard, blend shader contains discard or earlier fragments in the shader are forced to do a late depth update, are allowed to (and used to) trigger operation in the manner of the technology described herein to (potentially) slow the processing of other fragments and/or sampling points, but fragments that are forced to perform a late depth update for any other reason are not allowed to (and not used to) trigger operation in the manner of the technology described herein to (potentially) slow the processing of other fragments and/or sampling points.

In an embodiment, the operation of the technology described herein whereby the event of a fragment passing the early culling test or tests is then used to determine whether the processing of any fragments in the processing pipeline should be slowed down, etc., is carried out in respect of fully opaque fragments only. Thus, if a fragment or set of plural fragments that passes the early culling test is or includes a transparent fragment (i.e. a fragment that is not fully opaque), that fragment or set of fragments is in an embodiment still passed on for processing, but in an embodiment the early culling test pass event associated with the fragment or set of fragments is not used to determine whether the processing of any fragments that are already in the processing pipeline should be slowed down, etc.

This straightforwardly disables the potential fragment or sampling point slowing down and "killing" operation of the technology described herein for fragments that are required to undergo alpha tests and alpha to coverage tests (and equally straightforwardly allows for the fact that a nearer transparent fragment and/or sampling point may not prevent a more distant fragment and/or sampling point from still being visible in the final output).

The Applicants have further recognised that where a fragment (or at least a sampling point associated with a fragment) undergoes and passes the early culling test, and meets the above criteria of having a full RGB write mask; the fragment not having a blend function that is dependent on previous RGBA values; a shader program for the fragment not reading from the tile buffer; the fragment being fully opaque; but the fragment is not forced to perform a late depth update for any reason at all, then for such fragments and/or sampling points it can in fact be concluded immediately at the early culling test stage that the sampling point, etc., will occlude any other sampling points, etc., having the same position that are already in the pipeline.

This is possible because, e.g., in the case of an early depth test, the sampling points and/or fragments already in the pipeline having the same positions can be assumed to be behind the new sampling points(s) and/or fragments that passed the early culling test, and so can be assumed to be occluded by those later sampling points and/or fragments (if the later sampling points and/or fragments are opaque) (as if the early depth test is passed, and late depth update is not being forced, the new sampling points(s) and/or fragments that passed the test must lie in front of any earlier sampling points and/or fragments having the same positions).

While it would be possible in this case still simply to send a "slow down" signal to fragments, etc., that are already in the pipeline, the Applicants have recognised that where such fragments, etc., pass the early culling test, it would in fact be possible safely to stop the processing of appropriate fragments, etc., that are already in the pipeline immediately (at that time).

Thus, in an embodiment, the technology described herein can also and does also use the result of a sampling point passing the early culling test to determine if the processing of another sampling point that is being processed in the graphics processing pipeline can be stopped (at least in the case where it can be known for certain at the early culling test stage that the tested sampling point(s) and/or fragment will "overdraw" (occlude) a sampling point and/or fragment that is already in the pipeline).

This then allows the technology described herein to further reduce the extent to which hidden surfaces are unnecessarily processed in the graphics processing pipeline, as compared, e.g., to existing early-depth testing techniques.

Thus, in an embodiment, the method of the technology described herein comprises:
performing an early culling test in respect of at least one sampling point associated with a fragment generated by the rasteriser before the fragment is sent to the renderer for processing; and
if the at least one sampling point passes the early culling test, sending the fragment onwards for processing; and
for fragments that have selected properties, determining, depending on the properties of the fragment, if the processing of another sampling point that is in the graphics processing pipeline should be slowed down or if the processing of another sampling point that is in the graphics processing pipeline can be stopped as a consequence of the at least one sampling point passing the early culling test.

Similarly, the graphics processing pipeline of the technology described herein is in an embodiment configured to:
in response to at least one sampling position associated with a fragment generated by the rasteriser passing the early culling test, send the fragment onwards for processing; and
depending on the properties of the fragment, determine if the processing of another sampling position that is in the graphics processing pipeline should be slowed down or determine if the processing of another sampling point that is in the graphics processing pipeline can be stopped as a consequence of the at least one sampling position passing the early culling test.

Thus, in an embodiment, the graphics processing system is configured to, for selected fragments (for fragments having particular, selected, properties) at least, if at least one sampling point associated with a fragment passes the early culling test, broadcast information relating to the at least one sampling point (and/or fragment in question) that has passed the early culling test, to at least one, in an embodiment other (and in an embodiment later), stage of the graphics processing pipeline, and the at least one stage of the graphics processing pipeline is configured to use the broadcast information associated with the at least one sampling point and/or fragment that passed the early culling test to determine if the processing of any fragments and/or sampling points associated with fragments that are currently at that stage should be slowed down or can be stopped.

As discussed above, in an embodiment the early culling test comprises an early depth test, the information that is broadcast to the stage(s) of the graphics processing pipeline comprises the position(s) of the sampling point(s) and/or fragment(s) that passed the early culling test, and/or the at least one stage of the graphics processing pipeline is configured to use the broadcast position information associated with the sampling point(s) and/or fragment(s) that passed the early culling test to determine if any sampling points and/or fragments that are currently at that stage occupy the same position in the render target (destination buffer), e.g. tile being processed, as the sampling points(s) and/or fragments that passed the early culling test, and to selectively stop the future processing of or selectively slow down the processing of, any sampling points and/or fragments that occupy the same position in the render target as the sampling points(s) and/or fragments that passed the early culling test.

As for the slowing down of the processing of fragments, etc., as a consequence of sampling points, etc., passing the early culling test, any or all of the available early cull tests (early cull testing stages) of the graphics processing pipeline in an embodiment can be and are configured to operate in (to trigger operation in) this manner. Where the graphics processing pipeline includes more than one early culling test (early cull testing stage), then in an embodiment all the early cull testing stages can trigger operation in this manner.

For those sampling points and/or fragments, etc., that meet the criteria for (potentially) immediately stopping the processing of other fragments, etc., that are already in the graphics processing pipeline, the operation is in an embodiment analogous to the operation described above for slowing down the processing of fragments etc., that are in the pipeline, save that instead of slowing down the processing of a fragment, etc., that is already in the pipeline, the processing of the fragment, etc., is (if appropriate) stopped (the fragment, etc., is (immediately) discarded).

Thus, for example, if the at least one sampling point in question passes the early culling test, then the sampling point (i.e. the fragment that the sampling point is associated with), the fragment, or set of plural fragments, that was tested is sent onwards for processing (e.g. towards the renderer), but it is also determined whether the processing of another sampling point that is in the pipeline can be stopped as a consequence of the sampling point passing the early culling test (and if it is then determined that the processing of a sampling point that is already in the pipeline can be stopped as a consequence of the sampling point, etc., passing the early culling test, the processing of that sampling point is in an embodiment then stopped).

Similarly, the process can in an embodiment operate at a sampling point level (resolution) (rather than, e.g. in respect of whole fragments), and thus test, and stop from further processing, individual sampling points associated with fragments that are already in the pipeline, and/or in respect of whole fragments, i.e. such that if a whole fragment (or set of plural fragments) passes the early culling test, it is then determined whether the processing of any fragments that are in the pipeline can be stopped, and/or in respect of sets of plural fragments, i.e. such that if a set of plural fragments passes the early culling test, it is then determined whether the processing of any fragments that are in the pipeline can be stopped. Equally, in an embodiment it is determined whether the processing of any one of plural sampling points and/or fragments that are already in the pipeline can be stopped as a consequence of the at least one sampling point and/or fragment passing the early culling test.

The determination of whether the processing of any other sampling points and/or fragments already in the pipeline can be stopped can be based on any desired and suitable criteria. In an embodiment, it is based on whether the sampling point(s) and/or fragment(s) that have passed the culling test will overdraw (and in an embodiment whether they will occlude) sampling points and/or fragments that are already in the pipeline (since if the later sampling point(s) and/or fragments have passed, e.g., an early depth test, and do not have late Z update forced, that should indicate that those sampling points and/or fragments will be in front of (and thus occlude, if they are opaque) any sampling points and/or fragments representing the same position(s) that have previously passed the early depth test).

Similarly, the determination of those sampling points and/or fragments that need no longer be processed in the event of an early cull test "pass" event is in an embodiment carried out by a later stage or stages of the graphics processing pipeline identifying (determining) any sampling points and/or fragments that it currently contains (e.g. is processing) that will be overdrawn by the sampling point or points and/or fragment or fragments (as appropriate) that passed the early cull test, and this is in an embodiment carried out by comparing the (e.g. (x, y)) positions of one or some or all of the sampling points and/or fragments currently occupying the pipeline stage with the (e.g. (x, y)) position(s) of the sampling point(s) and/or fragment(s) that passed the early culling test with the processing of any current sampling points and/or fragments that occupy the same positions in (the plane of) the render output (i.e. that have the same (x, y) positions) as the sampling point(s) and/or fragment(s) (as appropriate) that passed the early culling test then being (selectively) stopped (e.g. subject to other criteria for stopping the sampling points' processing also being met).

(The determination of those sampling points and/or fragments that need no longer be processed in the event of an early cull test "pass" event, such as the comparison of the fragment positions, is again in an embodiment carried out in an appropriately conservative manner, to avoid or reduce the risk of incorrectly discarding sampling points and/or fragments from further processing.)

Similarly, if a fragment (or sampling point) is found to be overdrawn or occluded by a fragment or fragments (or sampling point) that passes the early culling test, other properties of the fragment (or sampling point) are in an embodiment first checked to see if the fragment (or sampling point) should still be processed, before stopping its processing, and this check in an embodiment comprises determining if the fragment (or sampling point) is still needed for an occlusion query (has an active occlusion query attached to it) or for other side effects (in which case it should not be discarded).

Similarly, the event of a sampling point or fragment or fragments passing the early culling test in an embodiment triggers the broadcasting of relevant information, such as, and in an embodiment, the position of the sampling point or fragment(s) that passed the test, to other, e.g. later, stages in the processing pipeline, with those other, e.g. later, stages in an embodiment then using that information to assess whether any of the sampling points or fragments that they are currently handling can have their processing stopped (e.g., and in an embodiment, in the manner discussed above). In an embodiment this "stop processing" broadcast is distinguished from the "slow down" processing broadcast discussed above by setting a bit or flag appropriately.

Similarly, the stage or stages of the processing pipeline where it is determined whether any sampling points and/or fragments need no longer be processed in the event of an early culling test "pass" event can comprise any desired and suitable stages of the graphics processing pipeline, but in an embodiment comprise at least one of, and in an embodiment all of: the renderer or a part or parts of the renderer of the graphics processing pipeline (with the renderer or part or parts of the renderer then operating accordingly); an early culling test stage or stages of the graphics processing pipeline; and the rasteriser of the graphics processing pipeline.

Similarly, in an embodiment, plural fragments (and in an embodiment all of the fragments in the stage) and/or sampling points can be tested in parallel.

The sampling points and/or fragments whose processing it is determined may be stopped can have their processing stopped and/or omitted in any desired and suitable fashion. In an embodiment this is done, as discussed above, by marking the so-identified sampling points and/or fragments as being "killed" (invalid), with the relevant processing stages then checking if a sampling points and/or fragment has not been killed (is valid) before doing any further processing on it. This will then avoid and/or stop any unnecessary processing of these sampling points and/or fragments.

In the case of sampling point, a sampling point is in an embodiment marked as invalid by setting its value in a coverage mask for the fragment in question appropriately.

When fragments as a whole are to be considered, each fragment could, e.g., have a "killed" ("invalid") bit associated with it (e.g. as part of its associated fragment data), which if set indicates that the fragment need not be processed (and can be discarded). In one embodiment this is what is done. The processing stages may then, e.g., check the invalid bit of each fragment they receive for processing. This bit could also be set if the testing of individual sampling points ultimately invalidates all the sampling points associated with a fragment.

Alternative arrangements, such as having a fragment queue with validity tags that operates like a cache to release queue (cache) lines if a fragment's invalid tag is set could instead or also be used if desired.

Although any "killed" fragment could remain in the pipeline (but not be processed), in an embodiment, steps are taken to remove invalid fragments from the pipeline. This is in an embodiment done by providing one or more compaction stages in the pipeline that are operable to remove any invalid fragments from the pipeline (that they receive). Such a compaction stage could comprise, for example, a FIFO (first-in, first-out) queue that operates to remove any invalid fragments (to clear out any holes) as the fragments work their way through the FIFO.

As will be appreciated from the above, the operation in the manner of the technology described herein (to potentially slow down or "kill" other fragments, etc., in the graphics pipeline) is in an embodiment performed in respect of selected fragments only, in an embodiment fragments that meet certain selected, in an embodiment predetermined, criteria (and that pass the early culling test(s)).

The criteria for a fragment that passes the early culling test(s) potentially triggering the "killing" (discarding) of another fragment, etc., that is in the pipeline in an embodiment comprise: the fragment having a full RGB write mask; the fragment not having a blend function that is dependent on previous RGBA values; a shader program for the fragment not reading from the tile buffer; the fragment being fully opaque; and the fragment not being forced (by the application programmer) to perform a late depth update.

Similarly, the criteria for a fragment that passes the early culling test(s) potentially triggering the slowing down of the processing of another fragment, etc., that is in the pipeline in an embodiment comprise: the fragment is to be subjected to a conditional discard test; the fragment having a full RGB write mask; the fragment not having a blend function that is dependent on previous RGBA values; a shader program for the fragment not reading from the tile buffer; the fragment being fully opaque; and the fragment not being forced (by the application programmer) to perform a late depth update for a reason other than: alpha test, alpha to coverage, shader contains discard, blend shader contains discard or earlier fragments having the same position in the shader are forced to perform a late depth update.

The stage(s) of the graphics processing pipeline can be configured to operate in the manner of the technology described herein in any suitable and desired manner. In an embodiment, the stages comprise combined test and update logic that is operable to carry out the culling and/or conditional discard tests, and to, if the test(s) is passed (or failed, for the conditional discard test at least), and the fragment meets any required criteria, "broadcast" the pass (or fail) event and the necessary information associated with that to the appropriate stages of the graphics pipeline.

The stage or stages of the graphics processing pipeline that are to respond to the early cull test and conditional discard test "pass" (or "fail", for the conditional discard test at least) events can be configured to do so in any suitable and desired manner. In an embodiment they have associated with them agents that are responsible for the fragments in the stage in question and which receive the test "pass" or "fail" information, and are then operable to identify any fragments and/or sampling points in their "domains" (stages) whose processing can be slowed down or revived, and/or that need no longer be processed, and to then slow down or revive (restore) the processing of, and/or prevent any unnecessary further processing of, those fragments and/or sampling points.

In some embodiments, the graphics processing pipeline comprises, and/or is in communication with, one or more memories and/or memory devices that store the data described herein and/or store software for performing the processes described herein. The graphics processing pipeline may also be in communication with a host microprocessor, and/or with a display for displaying images based on the data generated by the graphics processor.

The renderer of the graphics processing pipeline should be operable to render (shade), graphics fragments it receives to generate the desired output graphics fragment data, as is known in the art. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc. In an embodiment the renderer comprises a fragment shader (a shader pipeline) (i.e. a programmable pipeline stage that is operable to and can be programmed to carry out fragment shading programs on fragments in order to render them). The technology described herein may be particularly advantageous where fragment shading is being used, as fragment shading can be a relatively costly process, and so more efficient early removal of hidden surfaces is particularly advantageous where fragment shading is being done.

As will be appreciated by those skilled in the art, the renderer will process the fragments it receives to then generate output rendered fragment data, which rendered fragment data is then in an embodiment written to an output buffer, such as a frame buffer, in external memory, for use (e.g. to display a frame on a display).

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

Although the technology described herein has been described above with particular reference to its use in a graphics processing pipeline, the Applicants have recognised that the principles of the technology described herein may equally be applied to other processing pipelines where entities that are to pass through the pipeline for processing are subjected to early culling tests to determine if they should be sent on to the rest of the pipeline for processing. For example, a process that searches for a solution using multiple parallel searches with different pivots could "cull" test each pivot for "closeness" to the solution before starting the searches, with new searches that are found to be closer to the solution then being used to slow the processing of (and potentially "kill") older searches that are farther away from the solution in the manner of the technology described herein.

Thus, another embodiment of the technology described herein comprises a method of operating a data processing pipeline that includes a plurality of stages, and that processes data entities that are sent through the pipeline to generate output data, the method comprising:

performing an early culling test on a data entity that is to be sent through the pipeline before the data entity is sent onwards through the pipeline for processing; and if the data entity passes the early culling test, sending the data entity onwards through the pipeline for processing and determining if the processing of another data entity that is already in the processing pipeline after the early culling test should be slowed down as a consequence of the data entity passing the early culling test;

and, in an embodiment, if the data entity fails the early culling test, not sending the data entity onwards through the pipeline for processing.

Another embodiment of the technology described herein comprises a data processing pipeline that includes a plurality of stages including at least one processing stage that processes data entities that are sent through the pipeline to generate output data and an early culling test stage that performs an early culling test on a data entity that is to be sent through the pipeline before the data entity is sent onwards through the pipeline for processing; wherein the data processing pipeline is configured to:

in response to a data entity passing the early culling test, send the data entity onwards through the pipeline for processing and determine if the processing of another data entity that is already in the processing pipeline after the early culling test should be slowed down as a consequence of the data entity passing the early culling test;

and, in an embodiment, in response to a data entity failing the early culling test, not send the data entity onwards through the pipeline for processing.

As will be appreciated by those skilled in the art, these embodiments of the technology described herein can and in embodiments do include any one or more or all of the features of the technology described herein, as appropriate. Thus, for example, the processing pipeline is in an embodiment a graphics processing pipeline, the entities that are tested are in an embodiment graphics fragments, and the later processing that the entities are to undergo is in an embodiment fragment shading.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described. These embodiments will be described primarily with reference to the use of the technology described herein in a graphics processing system. However, as noted above, the technology described herein is applicable to other pipelined data processing systems which include early "data entity" culling tests.

FIG. 1 shows schematically a graphics processor 1 that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems, as discussed above.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1, as is known in the art.

As shown in FIG. 1, this part of the fragment processing pipeline of the graphics processor 1 includes a number of processing stages, including a rasterisation stage 3, an early hierarchical ZS (depth and stencil) test stage 4, an early ZS (depth and stencil) stage 13, a rendering stage in the form of a fragment shading stage 6, and a late ZS (depth and stencil) test stage 7.

The rasterisation stage 3 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives. In the present embodiment, each graphic fragment that is generated by the rasteriser 3 represents (has associated with it) plural (and normally 4) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 3 is a hierarchical rasteriser that operates to iteratively test primitives against progressively smaller patches of sampling points (and thus, correspondingly, patches of fragments) down to a minimum patch size corresponding to a 2×2 group of fragments (i.e. to an array of sampling points that would be rasterised to a 2×2 group of fragments), discarding any patches that do not (at least in part) cover the primitive. Each patch that is tested corresponds to a given set of fragments.

This is done by the rasteriser 3 starting with a large patch of the render target area and testing if the primitive in question is inside that patch. If not, the entire patch is discarded, and the next patch tested, and so on. On the other hand, if a primitive is found to be within the patch (to cover, at least in part, the patch), the patch is sub-divided into 4 parts, and each "sub-patch" is then tested in the same way, and so on, until the minimum patch size is reached.

Once the minimum patch size has been reached (i.e. a patch of 2×2 fragments that covers, at least in part, the primitive has been identified), the rasteriser 3 then tests the individual sampling points in that final patch to see if the sampling points are covered by the primitive. The rasteriser 3 then generates and outputs individual fragments for rendering corresponding to the sampling points found to be covered by the primitive.

The rasteriser 3 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

Other rasterisation arrangements would, of course, be possible.

As shown in FIG. 1, the rasteriser 3 also has an early "hierarchical" depth (Z) and stencil testing stage 4 associated with it. This hierarchical depth and stencil testing stage 4 performs "early" depth and stencil tests on the patches generated by the rasteriser 3 to see if those patches can be culled.

To do this, each patch of sampling points (of fragments, in effect) generated by the rasteriser is sent to the early hierarchical depth and stencil test stage 4, which then performs a Z (depth) test on the patch of sampling points (of fragments) to see if the patch can be discarded (culled) at this stage. To do this, the early hierarchical depth and stencil tester 4 derives a depth value range for each patch it receives from the rasteriser 3 by taking appropriate depth samples across the patch, and compares that depth value range with a previously derived and stored depth value range associated with the sampling (fragment) positions that the patch covers, to try to determine whether the patch will be occluded by or overdraw other fragments and sampling points to be rendered (e.g. that are further on in the pipeline or that have already been rendered) or not. At the same time, an early stencil test is carried out.

If the patch being tested fails the early depth and stencil test, it is discarded (culled) from any further processing.

If the patch being tested passes the early depth and stencil test, it is returned to the rasteriser 3 for further subdivision into smaller, "sub-patches", as discussed above. Each "sub-patch" is then returned to the early depth and stencil tester 4 for testing, and so on, until the minimum patch size is reached.

The depth value ranges that are used by the early hierarchical depth and stencil testing stage 4 when performing depth and stencil tests on patches of plural sampling points that it receives from the rasteriser 3 are stored in the depth and stencil buffers 5. A range of depth values (and a stencil value) is stored in the depth and stencil buffer 5 for each patch size and position that the buffer represents (essentially for each patch size and position that the rasterizer 3 could generate for the tile that is being processed).

The depth value range that is stored for each patch is initially set to a default value, or to an expected depth value range for the patch if that can be determined. (In some arrangements, the range of possible depth values that primitives for a tile may have may be known in advance. This can then be used to populate the depth buffer 5 with ranges of expected depth values for the patches in question.) The stored patch depth value ranges are then updated as patches and/or sampling points being tested by the early hierarchical depth and stencil testing stage 4, the early depth and stencil testing stage 13, and the late depth and stencil testing stage 7, pass the respective depth and stencil tests.

Storing expected ranges of depth values for patches of plural sampling point positions (and thus fragments) of a tile being rendered in the depth and stencil buffer 5 means that the early hierarchical depth and stencil tester 4 can still carry out a depth and stencil test in respect of patches of sampling point positions generated by the rasteriser 3 even if earlier fragments that are already in the pipeline having the same position have not completed any depth or stencil test yet (e.g. did not undergo the early hierarchical depth and stencil test 4 and the early depth and stencil test 13, and have yet to undergo the late depth and stencil test 7). This is because the ranges of expected depth values can be used to determine which possible outcomes the depth test (e.g.) may have, even if a depth test in respect of earlier fragments has not yet been performed. This then allows the early hierarchical depth and stencil test 4 to be used to (potentially) stop the processing of earlier fragments that are in the pipeline in the manner of the present embodiment even if those earlier fragments have not in fact undergone a depth or stencil test yet.

Storing and testing ranges of depth values for patches of sampling point positions means that larger patches of sampling point positions can readily be subjected to an early depth and stencil test (as the stored ranges allow the test to determine if the patch will be entirely outside the stored range and thus, for example, pass the early hierarchical depth and stencil test in its entirety). This facilitates, as will be discussed further below, broadcasting an early depth and stencil test pass event that affects a much larger area of the render target in a single processing cycle, such that it may then be possible to (potentially) stop the processing of an entire group of fragments within the patch area in one processing cycle (instead of, e.g., having to potentially stop the processing of each fragment one-by-one).

The early hierarchical depth and stencil test stage 4 is configured to operate in an appropriately conservative manner, as is known in the art.

Once the minimum patch size is reached (a patch of 2×2 fragments in this embodiment), the rasteriser 3 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 3 to an early depth and stencil test in the early depth and stencil test stage 13. This early depth and stencil test stage 13 performs depth and stencil tests on the individual (covered) sampling positions associated with the fragments issued by the rasteriser 3 (i.e. at a per-sampling point resolution).

To do this, the early depth and stencil tester 13 uses per-sampling position depth and stencil values stored in the depth and stencil buffers 5. Thus, the depth and stencil buffers 5 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 13 and the late depth and stencil testing stage 7 pass the respective depth and stencil tests.

The depth and stencil buffers 5 are configured as two distinct buffers (although they may in the same physical memory) in this embodiment, one buffer storing per-patch depth ranges, and the other storing per-sample depth values. Other arrangements would, of course, be possible.

The early depth and stencil test stage 13 is again configured to operate in an appropriately conservative manner, as is known in the art.

Fragments that pass the early depth and stencil test stage 13 (i.e. fragments having at least one associated sampling position that passes the early depth and stencil test stage 13) are then sent onwards to the fragment shading stage 6 (the renderer) via a "queue" 12 (the function and purpose of this queue 12 will be discussed in more detail below), as shown in FIG. 1.

(Fragments that fail the early depth and stencil test stage 13 are culled by the early depth and stencil test stage 13, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 6 should be stored in the tile buffers (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes the basic rasterisation and rendering process of the graphics processing system shown in FIG. 1. The operation of the graphics processing system shown in FIG. 1 in accordance with an embodiment of the technology described herein will accordingly now be described.

In accordance with the technology described herein, the present embodiment uses the result of a patch passing the early hierarchical depth test 4, or of a fragment passing the early depth test 13, respectively, to determine if the processing of other fragments that are in the graphics processing pipeline should be slowed down or can be stopped.

To do this, as shown in FIG. 1, the early hierarchical depth and stencil testing stage 4 and the early depth and stencil testing stage 13 are configured to, if a patch of fragments, or a fragment, respectively, passes the respective early culling test, not only pass the patch or fragment on to its next stage in the processing pipeline, but also to broadcast information relating to that early culling test "pass" event to stages of the pipeline (as shown by the dashed lines 9, 10, 11, 14 in FIG. 1). They are also configured to update the depth and stencil buffers 5 with the relevant depth values and/or stencil values for the sampling points associated with the fragment that passed the early depth test (where that can be done).

The broadcasting of a culling test "pass" event and the updating of the depth buffers etc., is not carried out for all patches and fragments that pass the early hierarchical depth test 4 and early depth test 13 in the present embodiment, but is only performed for patches and fragments that meet certain criteria (that have certain properties). This is so as to avoid erroneously slowing and discarding fragments in the pipeline when a later fragment passes an early depth test.

The present embodiment uses an "auto-detection" scheme in the early hierarchical depth and stencil test unit 4 and in the early depth and stencil test unit 13 to determine if an early depth test "pass" event should be broadcast to the pipeline or not, and the form that the early depth test "pass" event broadcast should take.

This auto-detection scheme has the following requirements for broadcasting (sending) to the pipeline an early depth test "pass" event that can trigger the stopping of the processing of other fragments that are in the graphics processing pipeline: the new patch or fragment must have passed the early z/s test (and be processed by the early z/s test and not the late z/s test); the new patch or fragment must have a full rgb writemask (z/stencil is already written to) and a blend function not dependent on previous rgba values; the shader for the new patch or fragment cannot read from the tilebuffer and the new patch or fragment must not have late z update forced.

(The new patch or fragment may have late z update forced for the following reasons, for example: alpha test; alpha to coverage; shader contains discard; blend shader contains discard; or earlier fragments in the shader are forced to do late z update. This "late z update forced" requirement accordingly means that the operation to immediately stop the processing of other fragments that are in the pipeline when the early Z test is passed is carried out for fully opaque patches and fragments only. This straightforwardly allows for the fact that a nearer transparent patch or fragment may not prevent a more distant fragment from still being visible in the final output.)

A new patch or fragment that meets the above criteria triggers the broadcasting (sending) to the pipeline an early depth test "pass" event that can trigger the stopping of the processing of other fragments that are in the graphics processing pipeline. If the patch or fragment does not meet these criteria, the "auto-detection" scheme in the early hierarchical depth and stencil test unit 4 and in the early depth and stencil test unit 13 then determines if the patch or fragment passing the early depth test should trigger broadcasting (sending) to the pipeline an early depth test "pass" event that can trigger the slowing down of the processing of other fragments that are in the graphics processing pipeline.

The auto-detection scheme has the following requirements for broadcasting (sending) to the pipeline an early depth test "pass" event that can trigger the slowing down of the processing of other fragments that are in the graphics processing pipeline: the new patch or fragment must have passed the early z/s test (and be processed by the early z/s test and not the late z/s test); the new patch or fragment must have a full rgb writemask (z/stencil is already written to) and a blend function not dependent on previous rgba values; the shader for the new patch or fragment cannot read from the tilebuffer and the new patch or fragment must not have late z update forced, for a reason other than: alpha test, alpha to coverage, shader contains discard, blend shader contains discard or earlier fragments having the same position in the shader are forced to perform a late depth update.

Thus in the present embodiment, fragments that are forced to perform a late depth update because of an alpha test, alpha to coverage test, shader contains discard, blend shader contains discard or earlier fragments in the shader are forced to do a late depth update, are allowed to (and used to) trigger operation to (potentially) slow the processing of other fragments and/or sampling points.

The effect of these criteria is essentially that a fragment that will be subject to any form of conditional discard test as part of its processing will trigger the broadcast to the pipeline an early depth test "pass" event that can trigger the slowing down of the processing of other fragments that are in the graphics processing pipeline, rather than the broadcast to the pipeline an early depth test "pass" event that can trigger the stopping of the processing of other fragments that are in the graphics processing pipeline. This is because where a fragment is subject to a conditional discard condition (test), it cannot be determined for certain at the early depth test stage that the fragment will ultimately occlude fragments that are already in the pipeline, even if the early depth test is passed.

Although the present embodiment uses an "auto-detection" scheme for triggering the broadcast of the early depth test pass event information in relation to a patch or fragment that passes the early hierarchical depth test 4 or the early depth test 13, it would be possible also to also use state bits as a fallback arrangement for this. A state bit can be set to turn off the "auto-detection" scheme, and to instead have the early culling test pass event information broadcast triggered by the setting (or not) of a further (e.g. culling test pass event "enable") state bit. This would then allow the application programmer, for example, to set whether the culling test pass event operation is to be performed or not (by setting the appropriate state bit).

The early hierarchical depth and stencil testing stage 4 and the early depth and stencil testing stage 13 comprise combined test and update logic that is operable to carry out the culling tests, and to, if the tests are passed, and the patch or fragment meets the required criteria, "broadcast" the pass event and the necessary information associated with that to the appropriate stages of the graphics pipeline, and to update the, e.g., depth information in the depth buffer(s), etc.

In the present embodiment, when a "qualifying" patch of sampling points (i.e. a patch of sampling points that meets the criteria to trigger the sending of a "stop processing" or a "slow down processing" signal) passes the early hierarchical depth test 4, the early hierarchical depth and stencil test stage 4 broadcasts 9, 10, 11, the (x, y) positions covered by the patch that passed the test to the queue 12, the fragment shading stage 6, the rasteriser 3, and the early hierarchical depth and stencil testing stage 4 itself (as shown by the dashed line 11 in FIG. 1). The broadcast information also includes an indication of whether the broadcast signal is to be used to determine whether the processing of any fragments should be stopped (whether any fragments should be discarded), or to determine whether the processing of any fragments should be slowed down, i.e. whether the broadcast signal is a fragment "kill" signal or a fragment "slow" signal. As will be discussed below, these stages of the graphics processing pipeline then use the broadcast signal type indication and the position information to assess whether any of the fragments that they are currently handling can have their processing stopped or should have their processing slowed down (as appropriate).

The early hierarchical depth test pass events are broadcast to the hierarchical depth and stencil testing stage 4 and to the rasteriser 3 in the present embodiment because the rasterizer 3 and the early hierarchical depth and stencil testing stage 4 operate, as discussed above, in an iterative manner and so there could, e.g., be patches of sampling points that were previously generated that are still undergoing rasterisation and the early hierarchical depth and stencil testing process whose processing could be omitted if a later, e.g. patch of sampling positions, can be determined to overdraw them.

As well as broadcasting the early hierarchical depth test pass event to other stages of the graphics processing pipeline, the early hierarchical depth (Z) and stencil testing stage 4 is also configured to, where appropriate, update the depth and stencil buffers 5 with the relevant depth value range and/or stencil values for the patch of sampling points that has passed the early hierarchical depth test. This then allows those buffers to contain an up-to-date record of the, e.g., depth value ranges of the patches that have undergone (and passed) the early hierarchical depth and stencil test 4, thereby making the early hierarchical depth and stencil tests more efficient.

This updating of the depth buffer, etc., is carried out in an appropriately conservative fashion, so as to avoid any risk that the updates could cause errors in the processing of patches, etc.

Correspondingly, in the present embodiment, when a "qualifying" fragment passes the early depth test 13, the early depth and stencil test stage 13 broadcasts 14 the (x, y) positions covered by the fragment that passed the test and a broadcast signal type indication (depending on the properties of the fragment in question) to the queue 12, and to the fragment shading stage 6 (as shown by the dashed line 14 in FIG. 1). As will be discussed below, these stages of the graphics processing pipeline then use the broadcast signal type indication and the position information to assess whether any of the fragments that they are currently handling can have their processing stopped or should have their processing slowed down (as appropriate).

Again, as well as broadcasting the early depth test pass event to other stages of the graphics processing pipeline, the early depth (Z) and stencil testing stage 13 is configured to update the depth and stencil buffers 5 with the relevant depth values and/or stencil values for the sampling points associated with the fragment that passed the early depth test. This then allows those buffers to contain an up-to-date record of the, e.g., depth values of the sampling points that have undergone (and passed) the early depth and stencil test 13, thereby making the early and late depth and stencil tests more efficient.

In response to the broadcast of an early depth test "pass" event fragment "kill" signal (i.e. indicating that it should be determined whether the processing of any fragments can be stopped in response to the broadcast signal) by the early hierarchical depth and stencil testing stage 4 and the early depth and stencil testing stage 13, the stages of the processing pipeline that receive that "kill" signal broadcast then use the position information in the broadcast signal to determine whether any fragments that they currently contain need no longer be processed as a consequence of the early cull test "pass" event. This process is carried out by comparing the (x, y) positions of all of the fragments currently occupying the pipeline stage with the (x, y) position(s) indicated by the broadcast "kill" signal (i.e. with the (x, y) positions of the fragment(s) and/or patch that passed the early culling test and triggered the broadcast of the fragment "kill" signal) broadcast by the early hierarchical depth and stencil test stage 4 or the early depth and stencil test stage 13 (as this will, in effect, identify any fragments that are currently in the stage that will be occluded by the patch or fragment that passed the early depth and stencil test).

The processing of any current fragments that have the same (x, y) positions as the patch or fragment(s) that passed the early culling test and triggered the fragment "kill" signal is then stopped, subject to certain other criteria for stopping the fragment's processing also being met. In particular, it is also checked whether the fragment in the pipeline potentially to be discarded (i.e. that will be occluded) should still be processed for any other reason, e.g., because it has a side effect that is still needed, such as being associated with an unresolved occlusion query. If the fragment that is occluded does not have a still-active occlusion query attached to it (and has no other required side effects), it is discarded (its processing is stopped), but if it does have an active occlusion query (or some other still required side effect) attached to it, is not discarded (i.e. its processing is continued). This check is performed by the stage of the graphics processing pipeline in question.

The determination of the fragments that need no longer be processed in the event of an early culling test fragment "kill" "pass" event is carried out in an appropriately conservative manner, to reduce the risk of incorrectly discarding fragments from further processing.

Each stage of the graphics processing pipeline tests all of the fragments in the stage in parallel. This allows the pipeline stages to discard fragments at the same rate as which early cull testing pass events can generate potential culling opportunities.

The fragments in the later processing stages have their processing stopped by marking the so-identified fragments as being "killed" (invalid). To facilitate this, each fragment has a "killed" bit associated with it (e.g. as part of its associated fragment data), which if set indicates that the fragment need not be processed (and can be discarded). The pipeline processing stages are configured to check the killed bit of each fragment they receive for processing (and to then process the fragment or not, accordingly).

Alternative arrangements, such as having a fragment queue with validity tags that operates like a cache to release queue (cache) lines if a fragment's invalid tag is set could instead or also be used if desired.

Each stage of the graphics processing pipeline that the early culling test fragment "kill" pass events are broadcast to has a corresponding agent that is responsible for all the fragments in its local domain (i.e. in the stage or part of the processing stage in question). Each agent keeps information about the fragments in its local domain and is operable to mark fragments as killed (invalid) to avoid and/or stop unnecessary processing of them in response to an early culling test fragment "kill" pass event that it receives. The agents are configured to be able to test all the fragments in their local domain in parallel.

In response to the broadcast of an early depth test "pass" event fragment "slow" signal (i.e. indicating that it should be determined whether the processing of any fragments should be slowed down in response to the broadcast signal) by the early hierarchical depth and stencil testing stage 4 and the early depth and stencil testing stage 13, the stages of the processing pipeline that receive that "slow down" signal broadcast then use the position information in the broadcast signal to determine whether the processing of any fragments that they currently contain should be slowed down as a consequence of the early cull test "pass" event.

This process is carried out by comparing the (x, y) positions of all of the fragments currently occupying the pipeline stage with the (x, y) position(s) indicated by the broadcast "slow down" signal (i.e. with the (x, y) positions of the fragment(s) and/or patch that passed the early culling test and triggered the broadcast of the fragment "slow down" signal) broadcast by the early hierarchical depth and stencil test stage 4 or the early depth and stencil test stage 13 (as this will, in effect, identify any fragments that are currently in the stage that could be occluded by the patch or fragment that passed the early depth and stencil test).

The processing of any current fragments that have the same (x, y) positions as the patch or fragment(s) that passed the early culling test and triggered the fragment "slow down" signal is then slowed down (delayed), subject to certain other criteria for delaying the fragment's processing also being met. In particular, it is also checked whether the fragment in the pipeline potentially to be slowed down should still be processed at the normal rate for any other reason, e.g., because it has a side effect that is still needed, such as being associated with an unresolved occlusion query. If the fragment that is to be slowed down does not have a still-active occlusion query attached to it (and has no other required side effects), its processing is slowed down, but if it does have an active occlusion query (or some other still required side effect) attached to it, its processing is not slowed down. This check is performed by the stage of the graphics processing pipeline in question.

The determination of the fragments whose processing should be slowed down in the event of an early culling test fragment "slow down" "pass" event is carried out in an appropriately conservative manner, to reduce the risk of incorrectly or inappropriately delaying the processing of fragments in the pipeline.

Each stage of the graphics processing pipeline tests all of the fragments in the stage in parallel. This allows the pipeline stages to delay (slow down) fragments at the same rate as which early cull testing pass events can generate potential "slow down" opportunities.

Each stage of the graphics processing pipeline that the early culling test fragment "slow down" pass events are broadcast to has a corresponding agent that is responsible for all the fragments in its local domain (i.e. in the stage or part of the processing stage in question) (this may be the same agent as handles the fragment "kill" early culling test pass events). Each agent keeps information about the fragments in its local domain and is operable to mark fragments as de-prioritised (slowed down) to slow their processing in response to an early culling test fragment "slow down" pass event that it receives. The agents are configured to be able to test all the fragments in their local domain in parallel.

The "slowed down" fragments are processed more slowly than they would normally be, but it should be noted that the intent is that the processing of the fragment is slowed down or delayed relative to the speed at which it would normally be processed through the pipeline, not that the fragment is at the time it is "slowed down" discarded (permanently stopped) from being processed further by the pipeline.

In the present embodiment, the arrangement is such that a "slowed down" fragment's processing is slowed to the extent that the fragment that triggered the slowing down of the processing of the fragment will tend to overtake the "slowed down" fragment point in the pipeline, such that the processing of the fragment that triggered the slowing down of the processing of the "slowed down" fragment in question will tend to (be likely to) complete the conditional discard test before the completion of the processing of the "slowed down" fragment in the pipeline. As will be discussed below, this then allows the "triggering" fragment to be used to (potentially) discard ("kill") the slowed down fragment from further processing by the pipeline.

In the present embodiment, the fragments whose processing is to be slowed down have their processing slowed down by de-prioritising their processing by the pipeline (i.e. by reducing their priority for processing by the pipeline). This is achieved by giving the "slowed down" fragments less priority for cache accesses and/or for other processing by the pipeline (relative to fragments that have not been slowed down).

The fragments are "de-prioritised" by marking the so-identified fragments as being "de-prioritised" (as having a reduced priority for processing). The relevant pipeline processing stages then check if a fragment has been marked as "de-prioritised" before doing any processing on it, and then process the fragment with normal or a reduced priority, accordingly.

Each fragment has a "de-prioritised" bit associated with it (e.g. as part of its associated fragment data), which if set indicates that processing of the fragment has been de-prioritised. The processing stages may then check the "de-prioritised" bit of each fragment they receive for processing.

Alternative arrangements for slowing down and delaying the processing of fragments could be used, if desired. For example, a fragment queue with de-prioritised tags that operates like a cache to release queue (cache) lines if a fragment's de-prioritised tag is set could instead or also be used if desired.

Another suitable arrangement would be for fragments having instructions to be processed to be placed in a fragment pool when an instruction is completed, and when there are cache hits and instructions are otherwise ready for execution, the appropriate fragments then taken out of the fragment pool and executed. Fragments could then have their priority for processing reduced by adding a priority condition as an additional factor to be considered when determining whether a fragment should be allowed to exit the fragment pool or not.

Similarly, the fragments could have their processing slowed down by pausing their processing by the pipeline (e.g., and in an embodiment, until the "triggering" fragment and/or sampling point has completed its conditional discard test or tests). Such pausing of the processing of a fragment in the pipeline could be achieved, e.g., by placing any fragments whose processing is to be paused in a "zombie pool" where their processing is paused.

When a fragment that has previously triggered the sending (broadcast) of a fragment "slow down" signal as a result of a patch passing the early hierarchical depth test 4, or of the fragment passing the early depth test 13, undergoes its conditional discard test(s), the present embodiment, as well as using the result of the conditional discard test(s) to discard or keep processing sampling points associated with the fragment (as is conventional), uses the result of a fragment passing or failing the conditional discard test(s) to determine if the processing of other earlier fragments that are in the graphics processing pipeline can be stopped or should be revived.

To do this, as shown in FIG. 1, the shader pipeline 6 where the conditional discard test(s) will be performed is configured to, when a fragment that has previously triggered the sending (broadcast) of a fragment "slow down" signal undergoes a conditional discard test, not only discard the fragment or pass the fragment on to its next stage in the processing (depending on the outcome of the test), but also to broadcast information relating to the conditional discard test "pass" or "fail" event to stages of the pipeline (as shown by the dashed lines 20, 21, 22, and 23 in FIG. 1).

The broadcasting of a conditional discard test "pass" or "fail" event is carried out for all fragments that have previously triggered the sending (broadcast) of a fragment "slow down" signal.

In the present embodiment the shader pipeline 6 determines if a conditional discard test "pass" or "fail" event should be broadcast to the pipeline or not, and the form that the conditional discard test "pass" or "fail" event broadcast should take. The broadcast also includes the "time stamp" of the primitive (so that only earlier primitives are (potentially) affected by the signal).

A fragment when it passes the final conditional discard test that it is to be subjected to (i.e. that passes all the conditional discard tests that it is to be subjected to) triggers the broadcasting (sending) to the pipeline of a conditional discard test "pass" event that can trigger the stopping of the processing of other fragments that are in the graphics processing pipeline and that entered the graphics processing pipeline before the fragment that triggers the broadcasting (sending) to the pipeline of a conditional discard test "pass" event.

A fragment that fails a conditional discard test triggers the broadcasting (sending) to the pipeline of a conditional discard test "fail" event that can trigger the revival (restoration) of the processing of previously slowed down fragments that are in the graphics processing pipeline and entered the graphics processing pipeline before the fragment that triggers the broadcasting (sending) to the pipeline of a conditional discard test "pass" event.

The shader pipeline stage 6 comprises combined test and update logic that is operable to carry out the conditional discard tests, and to, if a fragment meets the required criteria, "broadcast" the pass or fail event and the necessary information associated with that to the appropriate stages of the graphics pipeline.

In the present embodiment, when a "qualifying" fragment (i.e. a fragment that meets the criteria to trigger the sending of a "backward" "stop processing" or "restore (revive) processing" signal) undergoes its conditional discard test, the shader pipeline stage 6 broadcasts 20, 21, the (x, y) positions covered by the fragment that underwent the test to the fragment shading stage 6 and the queue 12 (this could also be broadcast to the rasteriser 3, and the early hierarchical depth and stencil testing stage 4, if desired). The broadcast information also includes an indication of whether the broadcast signal is to be used to determine whether the processing of any fragments should be stopped (whether any fragments should be discarded), or to determine whether the processing of any fragments should be revived (restored), i.e. whether the broadcast signal is a "backward fragment kill" signal, or a "backward fragment revive" signal, and a timestamp indicating the "age" of the fragment in question. As will be discussed below, these stages of the graphics processing pipeline then use the broadcast signal type indication and the position and "age" information to assess whether any of the fragments that they are currently handling can have their processing stopped or should have their processing revived (as appropriate).

In response to the broadcast of a conditional discard test "pass" event "backward fragment kill" signal (i.e. indicating that it should be determined whether the processing of any fragments can be stopped in response to the broadcast signal), the stages of the processing pipeline that receive that "kill" signal broadcast then use the position information in the broadcast signal to determine whether any fragments that they currently contain need no longer be processed as a consequence of the conditional discard test "pass" event. This process is carried out by comparing the (x, y) positions of all of the (older) fragments currently occupying the pipeline stage with the (x, y) position(s) indicated by the broadcast "kill" signal (i.e. with the (x, y) positions of the fragment that passed the conditional discard test and triggered the broadcast of the backward fragment "kill" signal) broadcast by the shader pipeline stage 6 (as this will, in effect, identify any (older) fragments that are currently in the stage that will be occluded by the fragment that passed its final conditional discard test).

The processing of any (older) current fragments that have the same (x, y) positions as the fragment that passed its final conditional discard test and triggered the "backward" fragment "kill" signal is then stopped, subject to certain other criteria for stopping the fragment's processing also being met. In particular, it is also checked whether the fragment in the pipeline potentially to be discarded (i.e. that will be occluded) should still be processed for any other reason, e.g., because it has a side effect that is still needed, such as being associated with an unresolved occlusion query. If the fragment that is occluded does not have a still-active occlusion query attached to it (and has no other required side effects), it is discarded (its processing is stopped), but if it does have an active occlusion query (or some other still required side effect) attached to it, is not discarded (i.e. its processing is continued). This check is performed by the stage of the graphics processing pipeline in question.

The determination of the fragments that need no longer be processed in the event of a conditional discard test fragment "kill" "pass" event is carried out in an appropriately conservative manner, to reduce the risk of incorrectly discarding fragments from further processing.

Each stage of the graphics processing pipeline tests all of the fragments in the stage in parallel. This allows the pipeline stages to discard fragments at the same rate as which conditional discard testing pass events can generate potential culling opportunities.

The fragments in the earlier processing stages have their processing stopped by marking the so-identified fragments as being "killed" (invalid). As discussed above, to do this, each fragment has a "killed" bit associated with it (e.g. as part of its associated fragment data), which if set indicates that the fragment need not be processed (and can be discarded).

(Again, alternative arrangements, such as having a fragment queue with validity tags that operates like a cache to release queue (cache) lines if a fragment's invalid tag is set could instead or also be used if desired.)

Each stage of the graphics processing pipeline that the conditional discard test "backward" fragment "kill" pass events are broadcast to has a corresponding agent that is responsible for all the fragments in its local domain (i.e. in the stage or part of the processing stage in question). This is in an embodiment the same agent as handles the fragment "kill" and "slow down" event broadcasts sent by the early depth testing stages. Each agent keeps information about the fragments in its local domain and is operable to mark fragments as killed (invalid) to avoid and/or stop unnecessary processing of them in response to a conditional discard test "backward" fragment "kill" pass event that it receives. The agents are configured to be able to test all the fragments in their local domain in parallel.

This "backward fragment kill" signal operation allows the result of a fragment that previously triggered the "slowing down" of the processing of other fragments that entered the pipeline before it, passing all its conditional discard tests to then be used to "kill" off any "slowed fragments" that the triggering fragment has overtaken in the pipeline and that will in fact be occluded by the triggering fragment, before those slowed fragments are fully processed by the pipeline. This then allows fragments that enter the pipeline later to be used to perform hidden surface removal in relation to fragments that entered the pipeline earlier (before them) (that were in front of the later fragment in the pipeline) even where it could not be determined with sufficient certainty at the early depth test stage whether the new fragment would actually occlude a fragment that is already in the pipeline.

In response to the broadcast of a conditional discard test "fail" event "backward fragment revive" signal by the shader pipeline stage 6 (i.e. indicating that it should be determined whether the processing of any fragments should be revived in response to the broadcast signal), the stages of the processing pipeline that receive that "revive" signal broadcast then use the position and "age" information in the broadcast signal to determine whether the processing of any fragments that they currently contain should be revived as a consequence of the conditional discard test "fail" event. This process is carried out by comparing the (x, y) positions and "ages" of all previously slowed down fragments currently occupying the pipeline stage with the (x, y) position(s) and "age" indicated by the broadcast "revive" signal (i.e. with the (x, y) positions and "age" of the fragment that failed the conditional discard test and triggered the broadcast of the fragment "revive" signal) broadcast by the shader pipeline stage 6 (as this will, in effect, identify any (older) fragments that are currently in the stage that it is now known will not be occluded by the fragment that failed the conditional discard test).

Each stage of the graphics processing pipeline again tests all of the fragments in the stage in parallel. This allows the pipeline stages to revive (slowed down) fragments at the same rate as which conditional discard testing fail events can generate potential "revival" opportunities.

In the present embodiment a fragment is revived by increasing its priority for processing (from, and relative to, its "slowed down", de-prioritised state). The fragments are restored to their original (the normal) processing priority and speed. This is done by no longer marking the "revived" fragments as being "de-prioritised". Thus, when a fragment is to be "revived", the appropriate "de-prioritised" bit associated with the fragment is updated (changed) (unset).

Each stage of the graphics processing pipeline that the conditional discard test "backward fragment revive" fail events are broadcast to has a corresponding agent that is responsible for all the fragments in its local domain (i.e. in the stage or part of the processing stage in question) (again, this may be the same agent as handles the fragment "kill" pass events, etc.). Each agent keeps information about the fragments in its local domain and is operable to mark fragments as no longer de-prioritised (no longer slowed down) to revive (restore) their processing in response to a conditional discard test fragment "revive" fail event that it receives. The agents are configured to be able to test all the fragments in their local domain in parallel.

(Where other arrangements are used for slowing down the processing of fragments, then the fragments should be revived in the appropriate manner. For example where a fragment queue with de-prioritised tags that operates like a cache to release queue (cache) lines if a fragment's de-prioritised tag is set is being used, the de-prioritised tags could be updated appropriately when a fragment is to be revived. Similarly, where fragments have their processing slowed down by pausing their processing by the pipeline, the fragments and/or sampling points can be revived by "unpausing" their processing, e.g. by removing them from a "zombie pool" where their processing was paused and returning them to the pipeline for processing in the normal manner.)

This "backward fragment revive" signal operation allows the result of a fragment that previously triggered the "slowing down" of the processing of other fragments that entered the pipeline before it, failing one of its conditional discard tests to then be used to "revive" (restore) any "slowed fragments" that the triggering fragment had overtaken in the pipeline and that will in fact not be occluded by the triggering fragment, so that the slowed down fragments are then processed normally again.

In the present embodiment, as well as any "slowed down" fragments being revived (restored) to be processed at the normal priority if the fragment that triggered the slowing of their processing subsequently fails a conditional discard test, "slowed down" fragments are discarded ("killed") if the fragment that triggered the slowing of their processing is discarded ("killed") by virtue of a "forward fragment kill" signal as a result of the operation of the present embodiment. In this case, the "forward fragment kill" signal which "kills" the "slowing" fragment also acts to "kill" the "slowed down" fragments in the same operation.

It will be appreciated from the above that in the present embodiment, a fragment, if it passes the early depth test and sends a signal that can trigger the slowing down of the processing of one or more fragments that are already in the pipeline, will then, when it undergoes its conditional discard test(s), either send a signal that can trigger the stopping of the processing of (the discarding of) one or more of the fragments whose processing it had previously slowed down if it passes all its conditional discard tests, or send a signal that can trigger the reviving of the processing of one or more of the fragments whose processing it had previously slowed down if it fails one of its conditional discard tests.

Similarly, a fragment whose processing has previously been slowed down as a result of a later fragment passing the early and depth stencil tests may subsequently have its processing either stopped or revived (restored), depending on the outcome of a conditional discard test on the fragment that triggered the slowing down of the processing of the fragment in the first place.

As shown in FIG. 1, in the present embodiment the graphics processing pipeline includes a queue 12 that the fragments must pass through which is positioned before the fragment shader 6 of the graphics processing pipeline. The queue 12 is configured to be able to hold one full tile-size set of fragments, although other arrangements would, of course, be possible.

The queue 12 has the effect of increasing the number of fragments that may be in the pipeline after the early culling test stages (i.e. after the hierarchical depth and stencil tester 4 and the early depth and stencil tester 13), thereby increasing the number of fragments that may be subjected to the operation in the manner of the present embodiment. The use of the queue 12 can increase significantly the likelihood of only ultimately visible fragments reaching (and being processed by) the fragment shading stage 6 that comes after the queue 12. This is advantageous, as fragment shading is typically a relatively costly process per fragment, and so the fewer fragments that enter the fragment shader, the better.

The fragments that enter the queue 12 exit the queue in the same order, but "killed" fragments trigger the freeing of resources when they exit the queue.

A number of variations and modifications to the operation of the technology described herein would be possible, if desired.

For example, "killed" fragments may remain in the pipeline (but not be processed), or it would be possible to (try to) remove killed fragments from the pipeline. The latter may be done by providing one or more compaction stages in the pipeline that are operable to remove any invalid (killed) fragments from the pipeline (that they receive). Such a compaction stage could comprise, for example, a FIFO (first-in, first-out) queue that operates to remove any invalid fragments (to clear out any holes) as the fragments work their way through the FIFO.

It would also be possible, e.g. to introduce a delay in the passing on of fragments (e.g. by stalling the pipeline operation) at one or more points in the pipeline, so as to give the operation in the manner of the present embodiment more time to invalidate fragments before that point in the pipeline. For example, where the pipeline includes a programmable fragment shader, it may be advantageous to delay (e.g. stall) the earlier part of the pipeline before the fragment shader to give more time (and hence more chance) for the operation in the manner of the present embodiment to invalidate fragments before they enter the fragment shader.

Also, although the present embodiment has been described above as testing and determining whether whole fragments that are in the pipeline can be "killed" (discarded), or slowed down and then (potentially) discarded, in the event of an early culling test pass event, it would be possible to carry out the slowing down and discarding at the level of individual sampling points and positions, instead of or as well as for whole fragments. In this case, individual sampling points in the pipeline stages could be tested to see if they can be killed or slowed down in the event of an early culling test pass event. This could then allow the system to, for example, "chip away" at the sampling points associated with a given fragment being rendered, even if the entire fragment cannot be killed or slowed down in the event of a single early culling test pass event. Once all the sampling points associated with a given fragment have been killed or slowed down by this process, then the fragment as a whole could be killed or slowed down (and then discarded, if appropriate), if desired.

Also, although, as discussed above, the present embodiment uses an "auto-detection" scheme to determine when an early culling test pass event should be broadcast to the pipeline, other arrangements, such as always using state configuration bits to indicate when the early culling test pass event information should be broadcast to the graphics processing pipeline for use to stop or slow down the processing of fragments that are in the pipeline could be used, if desired.

Also, although in the present embodiment the early hierarchical depth and stencil testing stage 4 and the early depth and stencil testing stage 13 are configured to update the depth and stencil buffer information when a patch of sampling positions or a fragment passes the respective early culling test, this is not necessary, and instead the operation could be simply to broadcast the early culling test pass event to the stages of the processing pipeline without updating the relevant buffer values.

Although the technology described herein has been described above with particular reference to graphics processing, as discussed above and as will be appreciated by those skilled in the art, the technology described herein is equally applicable to other data processing pipeline arrangements which include early culling tests that can be used to eliminate data entities that are to be processed.

It can be seen from the above that the technology described herein, in its embodiments at least, provides a mechanism for further reducing the amount of (ultimately redundant) processing of hidden surfaces that may take place in a pipelined graphics processing system. Moreover, the arrangement of the technology described herein is such that it will not intervene when the rendering order is optimal for a classic rendering pipeline (thereby giving minimal cost over existing rendering pipeline arrangements with optimum rendering order), but will take effect when the rendering order is non-optimal, and in that case can, at least in embodiments of the technology described herein, eliminate back-to-front fragments and hidden surfaces to the point where it can become as efficient at hidden surface removal as a pre-rendering per sample or per fragment sorting process. It may also be able to do this more efficiently than sorting where the content to be rendered is such that a sorting algorithm cannot easily detect the best way to sort (e.g. where primitives are intersecting or have overlapping depth ranges).

The technique of the technology described herein is also independent of the level of multi-sampled anti-aliasing being used, thereby making the use of higher order multi-sampled anti-aliasing significantly cheaper.

This is achieved, in embodiments of the technology described herein at least, by configuring the early culling test stages of the processing pipeline to broadcast information about fragments, etc., that pass those early culling tests to other, e.g. later stages in the pipeline, with those other stages in the pipeline then using the early culling test pass information to determine if the processing of any fragments that they are currently processing can be stopped or should be slowed down (and in this case then, subsequently, omitted).

Using the result of an early culling test pass event to determine if the processing of any fragments that are already in the pipeline should be slowed down in particular facilitates subsequently stopping the processing of fragments that entered the pipeline earlier, but for which it cannot be determined for certain at the early cull testing stage that the later fragment will occlude, e.g., because the later fragment is to be subjected to one or more conditional discard tests during its processing by the graphics processing pipeline. This accordingly allows the processing of more fragments to be stopped before they reach the end of the pipeline than an arrangement in which the early culling test is used solely to immediately discard ("kill") any fragment in the pipeline that it can be certain the later fragment will occlude.

In effect, the fragment slowing down process operates to de-prioritise fragments that it can be determined at the early cull testing stage could be overdrawn by a later fragment. Those slowed down fragments are then later either discarded ("killed") or revived (re-prioritised) once it is determined for certain whether they will be overdrawn or it is determined that that will not happen or can never be known for certain, respectively (i.e. when it is known whether the result of the slowed down fragment will in fact not be needed or not).

It should be noted here that this fragment slowing down and subsequent "killing" operation of the present embodiment (and of the technology described herein) does not simply locally reorder fragments within a few cycles of the current fragment, but will have the effect of letting the fragments complete out of order (by, in effect, delaying the processing of fragments that entered the pipeline earlier), and, moreover, does not still inevitably process all the fragments, but operates to discard and not process any fragments found not to be needed.

By adding a queue to the processing pipeline, the efficiency of the process can be further enhanced.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:
   performing an early culling test in respect of at least one sampling point associated with a fragment generated by the rasteriser before the fragment is sent to the renderer for processing; and
   if the at least one sampling point passes the early culling test, sending the fragment onwards for processing and in response to the at least one sampling point passing the early culling test, determining if the processing of another sampling point that is in the graphics processing pipeline should be slowed down.

2. The method of claim 1, wherein the determination of whether the processing of another sampling point already in the graphics processing pipeline should be slowed down is based on whether the sampling point that passes the early culling test also has a particular property or properties.

3. The method of claim 2, wherein the particular property comprises the sampling point being subject to one or more conditional discard tests as part of its processing.

4. The method of claim 1, comprising:
   slowing down the processing of another sampling point that is in the pipeline by de-prioritising the processing of the sampling point in the pipeline.

5. The method of claim 1, wherein the step of determining if the processing of another sampling point that is in the graphics processing pipeline can be slowed down in response to the at least one sampling point passing the early culling test comprises comparing the positions of sampling points and/or fragments currently occupying a pipeline stage with the position of the at least one sampling point that passed the early culling test.

6. The method of claim 1, wherein the step of determining if the processing of another sampling point that is in the graphics processing pipeline can be slowed down in response to the at least one sampling point passing the early culling test further comprises checking other properties of the another sampling point to see if the another sampling point should still be processed with normal priority, before slowing down its processing.

7. The method of claim 1, further comprising:
   performing one or more conditional discard tests for at least one sampling point associated with a fragment generated by the rasteriser that previously triggered a determination as to whether the processing of another sampling point that is in the graphics processing pipeline should be slowed down; and
   if the at least one sampling point passes all the conditional discard tests it is to be subjected to, and it was determined that the processing of another sampling point that is in the graphics processing pipeline should be slowed down as a consequence of the at least one sampling point passing the early culling test, determining if the processing of the another sampling point can be stopped as a consequence of the at least one sampling point passing all the conditional discard tests.

8. The method of claim 1, further comprising:
   performing one or more conditional discard tests for at least one sampling point associated with a fragment generated by the rasteriser that previously triggered a determination as to whether the processing of another sampling point that is in the graphics processing pipeline should be slowed down; and
   if the at least one sampling point fails a conditional discard test it was to be subjected to, and it was determined that the processing of another sampling point that is in the graphics processing pipeline should be slowed down as a consequence of the at least one sampling point passing the early culling test, determining if the processing of the another sampling point should be revived as a consequence of the at least one sampling point failing the conditional discard test.

9. The method of claim 1, comprising:
   performing an early culling test in respect of at least one sampling point associated with a fragment generated by the rasteriser before the fragment is sent to the renderer for processing; and
   if the at least one sampling point passes the early culling test, sending the fragment onwards for processing; and
   for fragments that have selected properties, determining, depending on the properties of the fragment, if the processing of another sampling point that is in the graphics processing pipeline should be slowed down, or if the processing of another sampling point that is in the graphics processing pipeline can be stopped, as a consequence of the at least one sampling point passing the early culling test.

10. A method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:
performing a conditional discard test in respect of at least one sampling point associated with a fragment generated by the rasteriser; and
if the at least one sampling point passes the conditional discard test, sending the fragment onwards in the pipeline and broadcasting information relating to the at least one sampling point that has passed the conditional discard test to at least one stage of the graphics processing pipeline; and
the at least one stage of the graphics processing pipeline using the broadcast information to determine if the processing of any fragment or sampling point associated with any fragment that is currently at that stage can be stopped as a consequence of the at least one sampling point passing the conditional discard test.

11. A graphics processing pipeline comprising:
a plurality of processing stages including a rasteriser that rasterises input primitives to generate graphics fragments to be processed, each graphics fragment having one or more sampling points associated with it, a renderer that processes fragments generated by the rasteriser to generate output fragment data, and an early culling test stage that performs an early culling test in respect of sampling points associated with fragments generated by the rasteriser before the fragments are sent to the renderer for processing; wherein the graphics processing pipeline is configured to:
in response to at least one sampling point associated with a fragment generated by the rasteriser passing the early culling test, send the fragment onwards for processing and determine if the processing of another sampling point that is in the graphics processing pipeline should be slowed down.

12. The graphics processing pipeline of claim 11, wherein the determination of whether the processing of another sampling point already in the graphics processing pipeline should be slowed down is based on whether the sampling point that passes the early culling test also has a particular property or properties.

13. The graphics processing pipeline of claim 12, wherein the particular property comprises the sampling point being subject to one or more conditional discard tests as part of its processing.

14. The graphics processing pipeline of claim 11, wherein the slowing down of the processing of another sampling point that is in the pipeline comprises de-prioritising the processing of the sampling point in the pipeline.

15. The graphics processing pipeline of claim 11, wherein the graphics processing pipeline is configured to determine if the processing of another sampling point that is in the graphics processing pipeline can be slowed down in response to the at least one sampling point passing the early culling test by comparing the positions of sampling points and/or fragments currently occupying a pipeline stage with the position of the at least one sampling point that passed the early culling test.

16. The graphics processing pipeline of claim 11, wherein the graphics processing pipeline is configured to check other properties of the another sampling point to see if the another sampling point should still be processed with normal priority, before slowing down its processing.

17. The graphics processing pipeline of claim 11, wherein the graphics processing pipeline is further configured to:
perform one or more conditional discard tests for at least one sampling point associated with a fragment generated by the rasteriser that previously triggered a determination as to whether the processing of another sampling point that is in the graphics processing pipeline should be slowed down; and
if the at least one sampling point passes all the conditional discard tests it is to be subjected to, and it was determined that the processing of another sampling point that is in the graphics processing pipeline should be slowed down as a consequence of the at least one sampling point passing the early culling test, determine if the processing of the another sampling point can be stopped as a consequence of the at least one sampling point passing all the conditional discard tests.

18. The graphics processing pipeline of claim 11, wherein the graphics processing pipeline is further configured to:
perform one or more conditional discard tests for at least one sampling point associated with a fragment generated by the rasteriser that previously triggered a determination as to whether the processing of another sampling point that is in the graphics processing pipeline should be slowed down; and
if the at least one sampling point fails a conditional discard test it was to be subjected to, and it was determined that the processing of another sampling point that is in the graphics processing pipeline should be slowed down as a consequence of the at least one sampling point passing the early culling test, determine if the processing of the another sampling point should be revived as a consequence of the at least one sampling point failing the conditional discard test.

19. The graphics processing pipeline of claim 11, wherein the graphics processing pipeline is further configured to:
perform an early culling test in respect of at least one sampling point associated with a fragment generated by the rasteriser before the fragment is sent to the renderer for processing; and
if the at least one sampling point passes the early culling test, send the fragment onwards for processing; and
for fragments that have selected properties, determine, depending on the properties of the fragment, if the processing of another sampling point that is in the graphics processing pipeline should be slowed down, or if the processing of another sampling point that is in the graphics processing pipeline can be stopped, as a consequence of the at least one sampling point passing the early culling test.

20. A graphics processing pipeline comprising:
a plurality of processing stages including a rasteriser that rasterises input primitives to generate graphics fragments to be processed, each graphics fragment having one or more sampling points associated with it, a renderer that processes fragments generated by the rasteriser to generate output fragment data, and in which:
conditional discard tests in respect of sampling points associated with fragments generated by the rasteriser may be performed; and
wherein the graphics processing pipeline is configured to:
in response to at least one sampling point associated with a fragment generated by the rasteriser passing a conditional discard test, send the fragment onwards in the pipeline and broadcast information relating to the at least one sampling point that has passed the conditional discard test to at least one stage of the graphics processing pipeline; and use the broadcast information to determine if the processing of any fragment or sampling point associated with any fragment that is currently at that stage can be stopped as a consequence of the at least one sampling point passing the conditional discard.

21. A non-transitory computer readable storage medium storing computer software code which when executing on a processor performs a method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:

performing an early culling test in respect of at least one sampling point associated with a fragment generated by the rasteriser before the fragment is sent to the renderer for processing; and if the at least one sampling point passes the early culling test, sending the fragment onwards for processing and in response to the at least one sampling point passing the early culling test, determining if the processing of another sampling point that is in the graphics processing pipeline should be slowed down.

22. A non-transitory computer readable storage medium storing computer software code which when executing on a processor performs a method of operating a graphics processing pipeline that includes a plurality of processing stages including a rasteriser that rasterises input primitives to generate graphic fragments to be processed, each graphics fragment having one or more sampling points associated with it, and a renderer that processes fragments generated by the rasteriser to generate output fragment data, the method comprising:

performing a conditional discard test in respect of at least one sampling point associated with a fragment generated by the rasteriser; and if the at least one sampling point passes the conditional discard test, sending the fragment onwards in the pipeline and broadcasting information relating to the at least one sampling point that has passed the conditional discard test to at least one stage of the graphics processing pipeline; and the at least one stage of the graphics processing pipeline using the broadcast information to determine if the processing of any fragment or sampling point associated with any fragment that is currently at that stage can be stopped as a consequence of the at least one sampling point passing the conditional discard test.

\* \* \* \* \*